United States Patent
Shikina et al.

(10) Patent No.: US 11,595,606 B2
(45) Date of Patent: Feb. 28, 2023

(54) PHOTOELECTRIC CONVERSION APPARATUS AND IMAGE CAPTURING APPARATUS WITH A/D CONVERSION AND DATA TRANSMISSION

(71) Applicant: CANON KABUSHIKI KAISHA, Tokyo (JP)

(72) Inventors: Noriyuki Shikina, Tokyo (JP); Yoshiko Shigiya, Tokyo (JP); Shintaro Takenaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/114,533

(22) Filed: Dec. 8, 2020

(65) Prior Publication Data
US 2021/0176421 A1 Jun. 10, 2021

(30) Foreign Application Priority Data
Dec. 10, 2019 (JP) .............................. JP2019-223001

(51) Int. Cl.
| | |
|---|---|
| *H04N 5/3745* | (2011.01) |
| *H04N 5/357* | (2011.01) |
| *H04N 5/374* | (2011.01) |
| *H04N 5/378* | (2011.01) |

(52) U.S. Cl.
CPC ......... *H04N 5/37455* (2013.01); *H04N 5/357* (2013.01); *H04N 5/378* (2013.01); *H04N 5/3742* (2013.01); *H04N 5/37452* (2013.01)

(58) Field of Classification Search
CPC ....... H04N 5/357–3675; H04N 5/3742; H04N 5/37452; H04N 5/37455; H04N 5/378; H04N 5/379
See application file for complete search history.

(56) References Cited

U.S. PATENT DOCUMENTS

| | | |
|---|---|---|
| 7,999,866 B2 | 8/2011 | Sonoda et al. |
| 8,049,799 B2 | 11/2011 | Sonoda et al. |
| 8,081,246 B2 | 12/2011 | Takenaka |
| 8,305,473 B2 | 11/2012 | Takenaka et al. |

(Continued)

FOREIGN PATENT DOCUMENTS

JP 2017-183659 A 10/2017

OTHER PUBLICATIONS

U.S. Appl. No. 17/198,848, filed Mar. 11, 2021 (First Named Inventor: Yoshiko Shigiya).

*Primary Examiner* — Twyler L Haskins
*Assistant Examiner* — Akshay Trehan
(74) *Attorney, Agent, or Firm* — Venable LLP

(57) ABSTRACT

A photoelectric conversion apparatus includes a pixel array having pixels arranged to form rows and columns and column signal lines configured to output noise signals and optical signals of the pixels, a driver configured to drive the pixels so that the optical signal is output following the noise signal from each pixel, A/D converters configured to perform A/D conversion to convert the noise signals output to the column signal lines into noise data and to subsequently perform A/D conversion to covert the optical signals output to the column signal lines into optical data, a data hold circuit, and a transmitter configured to transmit the noise data converted by the A/D converters to the data hold circuit and to subsequently transmit the optical data converted by the A/D converters to the data hold circuit.

31 Claims, 15 Drawing Sheets

(56) References Cited

U.S. PATENT DOCUMENTS

| | | |
|---|---|---|
| 8,363,137 B2 | 1/2013 | Sonoda et al. |
| 8,670,058 B2 | 3/2014 | Hayashi et al. |
| 9,654,697 B2 | 5/2017 | Takenaka et al. |
| 9,843,752 B2 | 12/2017 | Yamamoto et al. |
| 10,277,839 B2 | 4/2019 | Takenaka et al. |
| 10,389,964 B2 | 8/2019 | Taniguchi et al. |
| 10,645,316 B2 | 5/2020 | Shigiya et al. |
| 10,659,713 B2 | 5/2020 | Shikina |
| 2009/0256939 A1* | 10/2009 | Sonoda .............. H04N 5/37455 348/E5.091 |
| 2015/0129744 A1 | 5/2015 | Sonoda et al. |
| 2018/0249110 A1* | 8/2018 | Kobayashi ............... G02B 7/34 |
| 2019/0104272 A1 | 4/2019 | Izuhara et al. |
| 2020/0154067 A1 | 5/2020 | Igarashi et al. |
| 2021/0044766 A1 | 2/2021 | Shikina et al. |
| 2021/0067717 A1 | 3/2021 | Shigiya et al. |

\* cited by examiner

FIG. 7A

| | | | T1 | T1w1 | T1w2 | T1w3 | T1w4 |
|---|---|---|---|---|---|---|---|
| HORIZONTAL SYNCHRONIZATION SIGNAL HD | | | | | | | |
| A/D CONVERSION | | | | N-AD | | S-AD | |
| HORIZONTAL TRANSMISSION | | | | N_vl#(h1) | | S_vl#(h1) | |
| NOISE DATA STORAGE | A STORAGE | WRITE OPERATION | | N_vl1(h1)<br>N_vl2(h1)<br>N_vl3(h1)<br>N_vl4(h1)<br>N_vl5(h1)<br>N_vl6(h1) | | | |
| | | READ OPERATION | | | | | |
| | B STORAGE | WRITE OPERATION | | | | | |
| | | READ OPERATION | | | | | |
| OPTICAL DATA STORAGE | A STORAGE | WRITE OPERATION | | | | | S_vl1(h1)<br>S_vl2(h1)<br>S_vl3(h1)<br>S_vl4(h1)<br>S_vl5(h1)<br>S_vl6(h1) |
| | | READ OPERATION | | | | | |
| | B STORAGE | WRITE OPERATION | | | | | |
| | | READ OPERATION | | | | | |

FIG. 11B

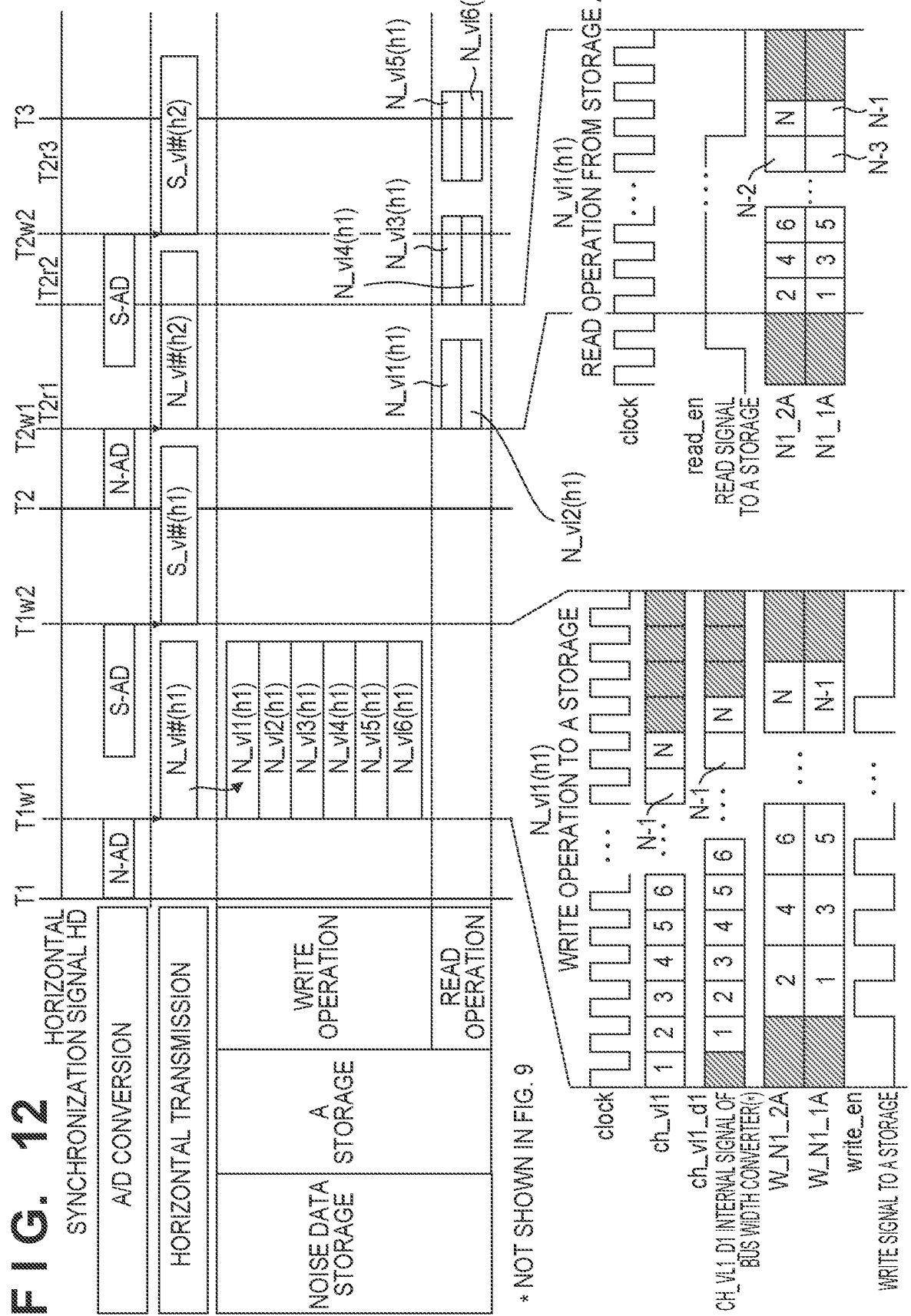

PHOTOELECTRIC CONVERSION APPARATUS AND IMAGE CAPTURING APPARATUS WITH A/D CONVERSION AND DATA TRANSMISSION

BACKGROUND OF THE INVENTION

Field of the Invention

The present invention relates to a photoelectric conversion apparatus and an image capturing apparatus.

Description of the Related Art

Japanese Patent Laid-Open No. 2017-183659 discloses a solid-state image capturing element that includes a pixel array, a plurality of A/D converters, a data latch circuit, a parallel-to-serial converter, a column decoder/sensor amplifier, a memory, a data processor, and an I/F. Each A/D converter generates pixel data by performing A/D conversion on an analog signal read out from each pixel of the pixel array through a signal line. During such an operation, each A/D converter generates pixel data corresponding to a difference between the signal level of the pixel and the reset level of the pixel. The plurality of pixel data generated by the plurality of A/D converters are transmitted to the data latch circuit and are transmitted to the memory via the parallel-to-serial converter and the column decoder/sensor amplifier. In addition, the column decoder/sensor amplifier amplifies a very low voltage, which has been read out from the memory via a bit line, to a level which can be handled in the digital level and outputs the amplified voltage as pixel data. The pixel data is provided to the data processor and processed by the data processor.

In the solid-state image capturing element disclosed in Japanese Patent Laid-Open No. 2017-183659, each A/D converter generates pixel data corresponding to the difference between the signal level of the pixel and the reset level of the pixel. Hence, the function of each A/D converter can become complicated.

SUMMARY OF THE INVENTION

The present invention provides an arrangement of a photoelectric conversion apparatus which is advantageous in simplifying the function of an A/D converter.

One of features of the present invention provides a photoelectric conversion apparatus comprising: a pixel array which includes a plurality of pixels arranged so as to form a plurality of rows and a plurality of columns and a plurality of column signal lines configured to output noise signals and optical signals of the plurality of pixels; a driver configured to drive the plurality of pixels so that the optical signal is output following the noise signal from each pixel; a plurality of A/D converters configured to perform A/D conversion to convert the noise signals output to the plurality of column signal lines into noise data and to subsequently perform A/D conversion to covert the optical signals output to the plurality of column signal lines into optical data; a data hold circuit; and a transmitter configured to transmit the noise data converted by the plurality of A/D converters to the data hold circuit and to subsequently transmit the optical data converted by the plurality of A/D converters to the data hold circuit.

Further features of the present invention will become apparent from the following description of exemplary embodiments with reference to the attached drawings.

BRIEF DESCRIPTION OF THE DRAWINGS

FIGS. 7A and 7B show a timing chart showing an example of an operation of the photoelectric conversion apparatus according to the first embodiment;

FIGS. 11A and 11B show a timing chart showing an example of an operation of the photoelectric conversion apparatus according to the second embodiment;

FIG. 12 is a timing chart showing an example of another operation of the photoelectric conversion apparatus according to the second embodiment.

DESCRIPTION OF THE EMBODIMENTS

Figure 1:
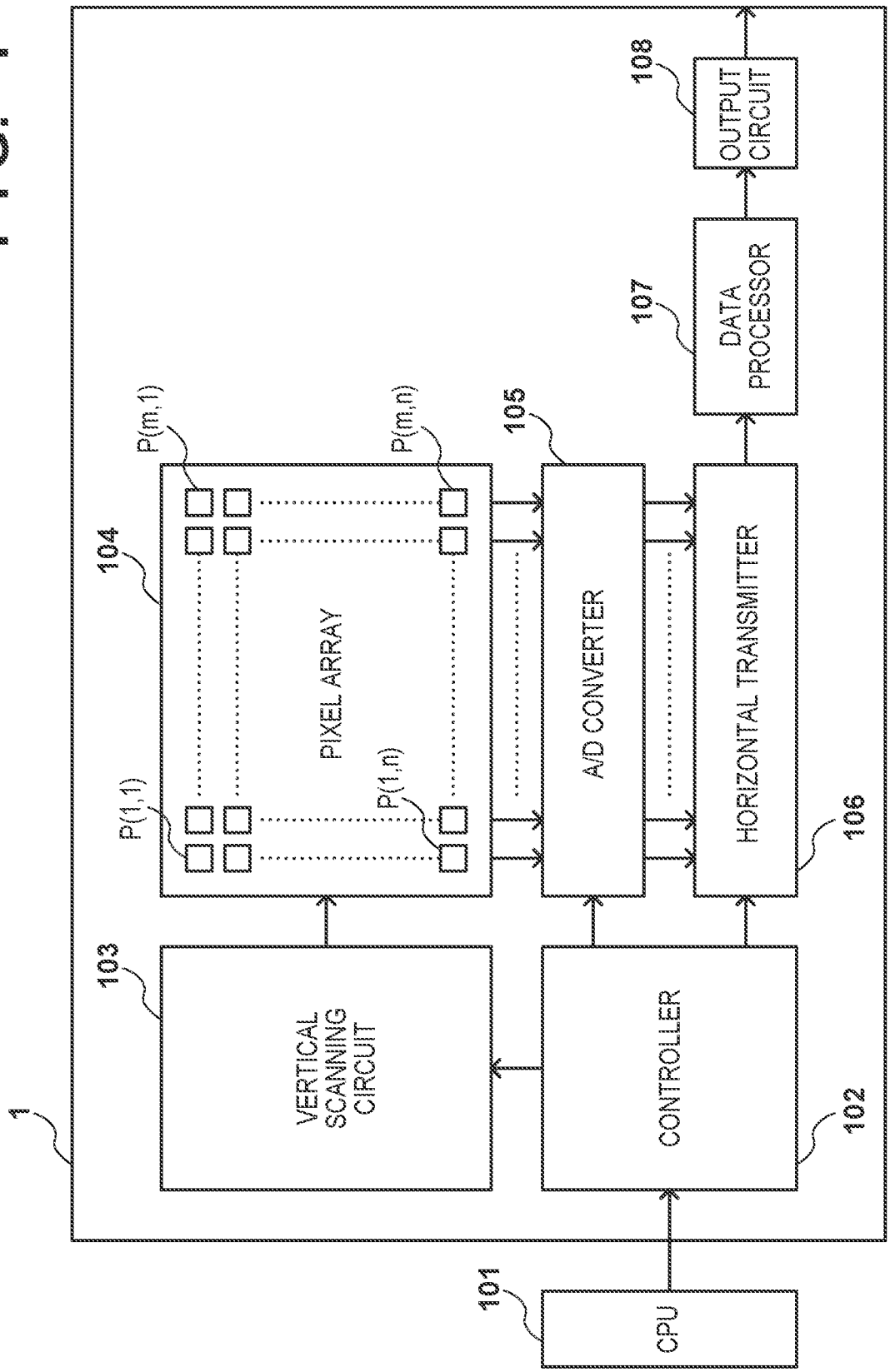
FIG. 1 is a block diagram showing an example of the arrangement of a photoelectric conversion apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

FIG. 1 shows the arrangement of a photoelectric conversion apparatus 1 according to the first embodiment. The photoelectric conversion apparatus 1 can be formed as, for example, a solid-state image capturing device. The photoelectric conversion apparatus 1 can be controlled by a CPU 101. The photoelectric conversion apparatus 1 can include, for example, a controller 102, a vertical scanning circuit (driver) 103, a pixel array 104, an A/D converter 105, a horizontal transmitter (transmitter) 106, a data processor 107, and a signal output circuit 108. The controller 102 can receive a control signal such as a synchronization signal or the like from the CPU 101 and operate in accordance with the control signal. The pixel array 104 includes a plurality of pixels P, which are arranged so as to form a plurality of rows (n rows) and a plurality of columns (m columns), and a plurality of column signal lines for outputting noise signals and optical signals from the plurality of pixels P. In this case, let n and m be arbitrary natural numbers. A pixel P(x, y) represents the pixel P arranged at an xth row and a yth column. The vertical scanning circuit (driver) 103 can receive a control signal provided form the controller 102 and drive the pixel array 104. More specifically, the vertical scanning circuit (driver) 103 can drive the plurality of pixels P so that each pixel P will output an optical signal after a noise signal. The photoelectric conversion apparatus 1 can be formed by a single semiconductor substrate. Alternatively, the photoelectric conversion apparatus 1 can be formed by stacking a plurality of semiconductor substrates. For example, the pixel array 104 can be arranged on a first semiconductor substrate. Next, the controller 102, the vertical scanning circuit (driver) 103, the A/D converter 105, the horizontal transmitter (transmitter) 106, the data processor 107, and the signal output circuit 108 can be arranged on a second semiconductor substrate. The CPU 101 may be partially or entirely incorporated in the photoelectric conversion apparatus 1.

The A/D converter 105 can include a plurality of A/D converters that perform A/D conversion to convert the noise signals, which are output to the plurality of column signal lines of the pixel array 104, into noise data and subsequently perform A/D conversion to convert the optical signals, which are output to the plurality of column signal lines, into optical data. The horizontal transmitter (transmitter) 106 can transmit the noise data converted by the A/D converter 105 to the data processor 107 and subsequently transmit the optical data converted by the A/D converter 105 to the data processor 107. The data processor 107 can include a data hold circuit and a calculation circuit. The signal output circuit 108 can output the data processed by the data processor 107.

Figure 2:
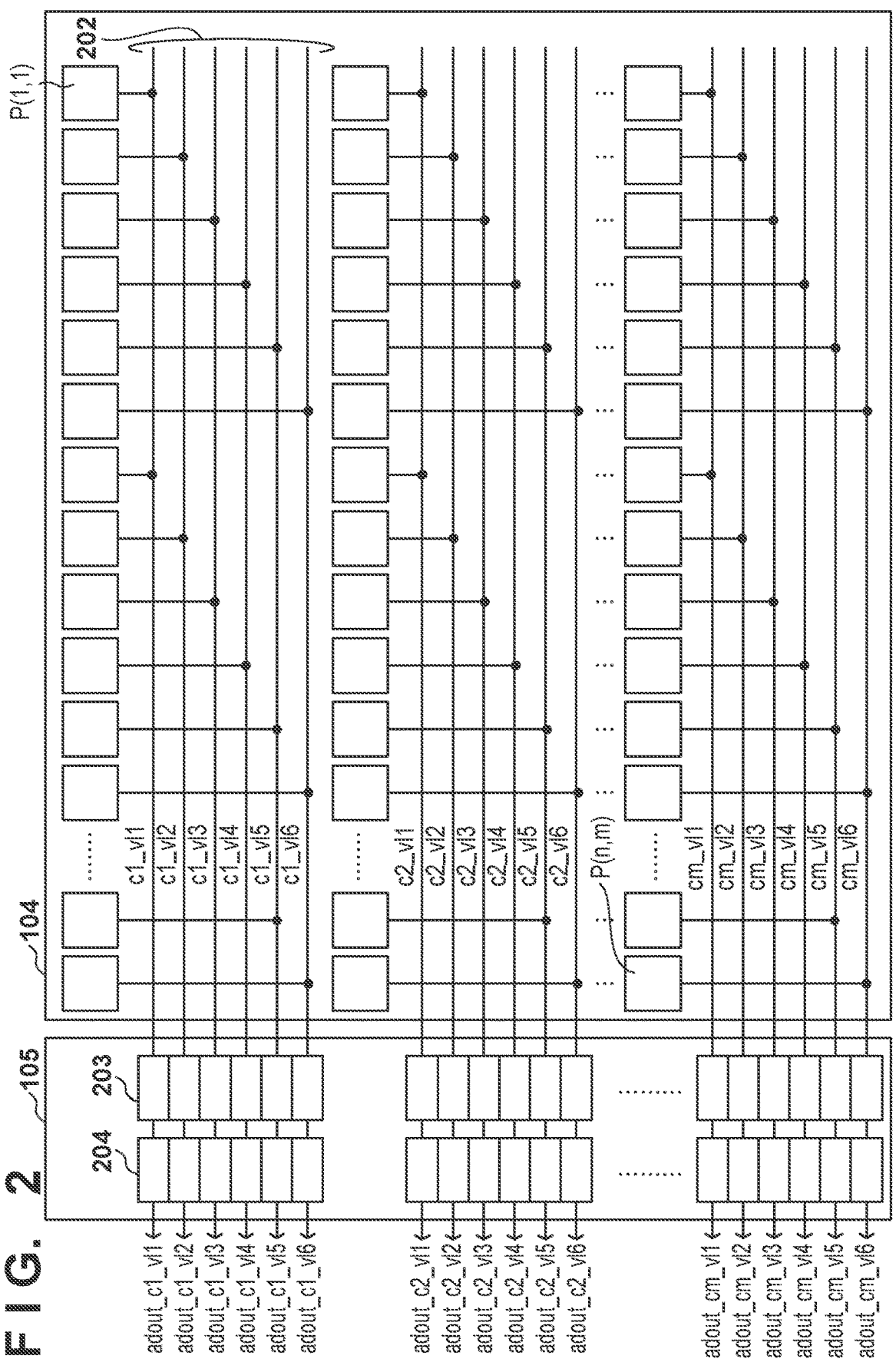
FIG. 2 is a block diagram showing an example of the arrangement of a pixel array and an A/D converter of the photoelectric conversion apparatus according to the first embodiment.

FIG. 2 shows an example of the arrangement of the pixel array 104 and the A/D converter 105. In the example shown in FIG. 2, the pixel array 104 includes a plurality of pixels P(1, 1) to P(n, m), arranged so as to form an array of n rows and m columns, and a plurality (m×I) of column signal lines 202. In this case, assume that I (first number) is an arbitrary natural number which is equal to or more than 2, and I=6 in the first embodiment. In the first embodiment, six column signal lines 202 are arranged in a single column. More specifically, a pixel P(1+6k, y) is connected to the first column signal line 202 of the yth column, a pixel P(2+6k, y) is connected to the second column signal line 202 of the yth column, and a pixel P(3+6k, y) is connected to the third column signal line 202 of the yth column. Also, a pixel P(4+6k, y) is connected to the fourth column signal line 202 of the yth column, a pixel P(5+6k, y) is connected to the fifth column signal line 202 of the yth column, and a pixel P(6+6k, y) is connected to the sixth column signal line 202 of the yth column. In this case, let k be every natural number which satisfies $0 \leq k < n/6$.

The A/D converter 105 includes a plurality of plurality of A/D converters 203, and the number of the plurality of A/D converters 203 can be the same as the number of the plurality of column signal lines 202. The A/D converter 105 can also include the same number of hold circuits 204 as the number of the plurality of A/D converters 203. A constant current source (not shown) can be connected to the plurality of column signal lines 202. A single A/D converter 203 of the plurality of A/D converters 203 is connected to a corresponding one of the column signal lines 202. The output of each A/D converter 203 is provided to the corresponding hold circuit 204 and is held by the corresponding hold circuit 204. In the first embodiment, six A/D converters 203 and six hold circuits 204 have been assigned with respect to each column of the pixel array 104.

In order to identify the plurality of column signal lines 202 from each other, the six column signal lines 202 of the first column are denoted by c1_vl# (#: 1 to 6), and the six column signal lines 202 of an mth column are denoted by cm_vl#. In addition, the data (the noise data and the optical data) which is obtained by causing the A/D converter 203 to perform A/D conversion on the signals (the noise signal and the optical signal) of the pixel P connected to the corresponding column signal line c1_vl# is output as data adout_c1_vl# from the corresponding hold circuit 204. In this case, the data adout_c1_vl# is digital data and is formed by a plurality of bits. The pixel P on the first row of the first column is connected to column signal line c1_vl1, and the pixel P on the second row of the first column is connected to the column signal line c1_vl2. In a similar manner, each pixel P is connected to the corresponding one of the six column signal lines 202 at a 6-row cycle per column.

Figure 3:
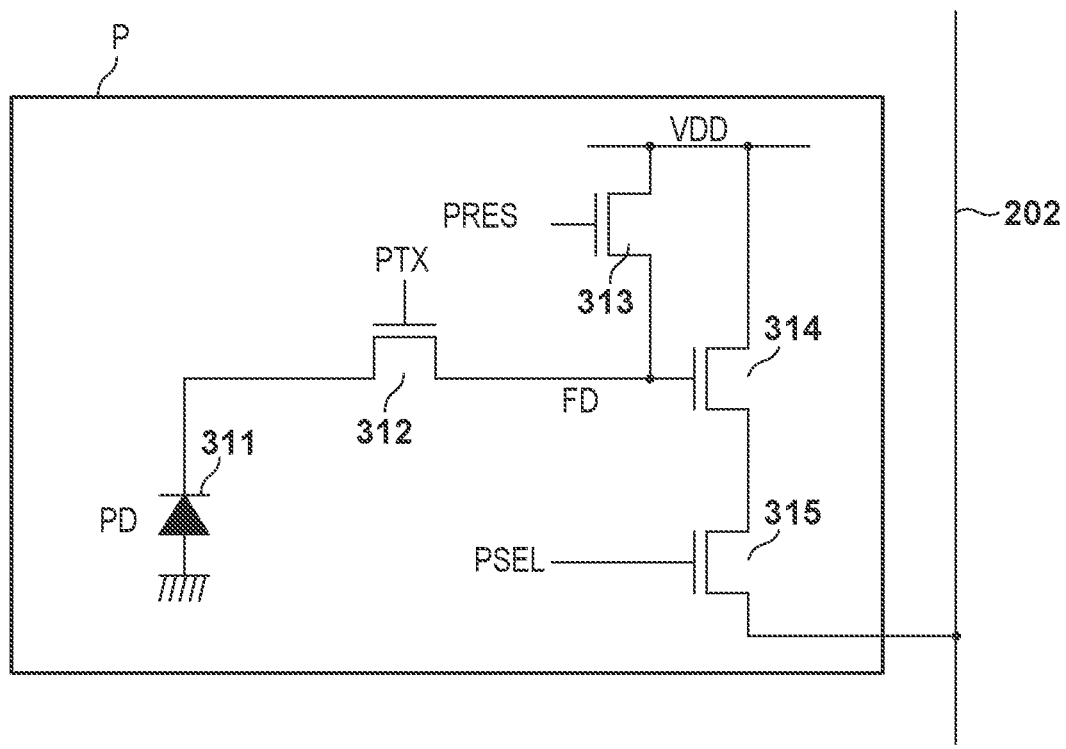
FIG. 3 is a block diagram showing an example of the arrangement of a pixel of the photoelectric conversion apparatus according to the first embodiment.

FIG. 3 shows an example of the arrangement of the pixel P. The pixel P can include a photoelectric conversion element (PD) 311, a charge transmitter 312, a floating diffusion FD, a reset circuit 313, an amplifier 314, and a row selector 315. The photoelectric conversion element 311 is an element that generates charges corresponding to the amount of light that entered the photoelectric conversion element 311 and can be, for example, a photodiode. The charge transmitter 312 is arranged between the photoelectric conversion element 311 and the floating diffusion FD. The charge transmitter 312 becomes conductive in response to a transmission signal PTX being driven to the active level (high level) by the vertical scanning circuit 103, and transmits the charges of the photoelectric conversion element 311 to the floating diffusion FD.

The reset circuit 313 is arranged between a power supply voltage VDD and the floating diffusion FD. The reset circuit 313 resets the voltage of the floating diffusion FD by supplying a voltage corresponding to the power supply voltage VDD to the floating diffusion FD. The reset circuit 313 becomes conductive in response to a reset signal PRES being driven to the active level (high level) by the vertical scanning circuit 103, and resets the voltage of the floating diffusion FD.

The floating diffusion FD is connected to the gate terminal of the amplifier 314, and the power supply voltage VDD and the row selector 315 are connected to the drain and the source, respectively, of the amplifier 314. The amplifier 314 forms a source-follower circuit together with the aforementioned constant current source, and outputs a voltage corresponding to the charges transmitted to the floating diffusion FD to the corresponding column signal line 202. The row selector 315 is arranged between the output of the amplifier 314 and the column signal lines 202. The row selector 315 is a transistor for setting each pixel P of the row selected by the vertical scanning circuit 103 in a selected state. The row selector 315 becomes conductive when the vertical scanning circuit 103 drives a selection signal PSEL to the active level (high level), and allows the amplifier 314 to drive the column signal line 202.

The vertical scanning circuit 103 drives the selected pixel P so that the selected pixel P will output a noise signal to the corresponding column signal line 202 and will subsequently output an optical signal to the corresponding column signal line 202. The noise signal is a signal output, after the resetting of the voltage of the floating diffusion FD by the reset circuit 313 has been canceled, from the amplifier 314 to the column signal line 202 before the charge transmitter 312 becomes conductive. The optical signal is a signal output from the amplifier 314 to the column signal line 202 in a state in which the charges generated by photoelectric conversion in the photoelectric conversion element 311 have been transmitted by the charge transmitter 312 to the floating diffusion FD. Noise corresponding to the reset noise of the floating diffusion FD can be removed by executing correlated double sampling (CDS) to obtain a signal corresponding to the difference between the optical signal and the noise signal.

Figure 4:
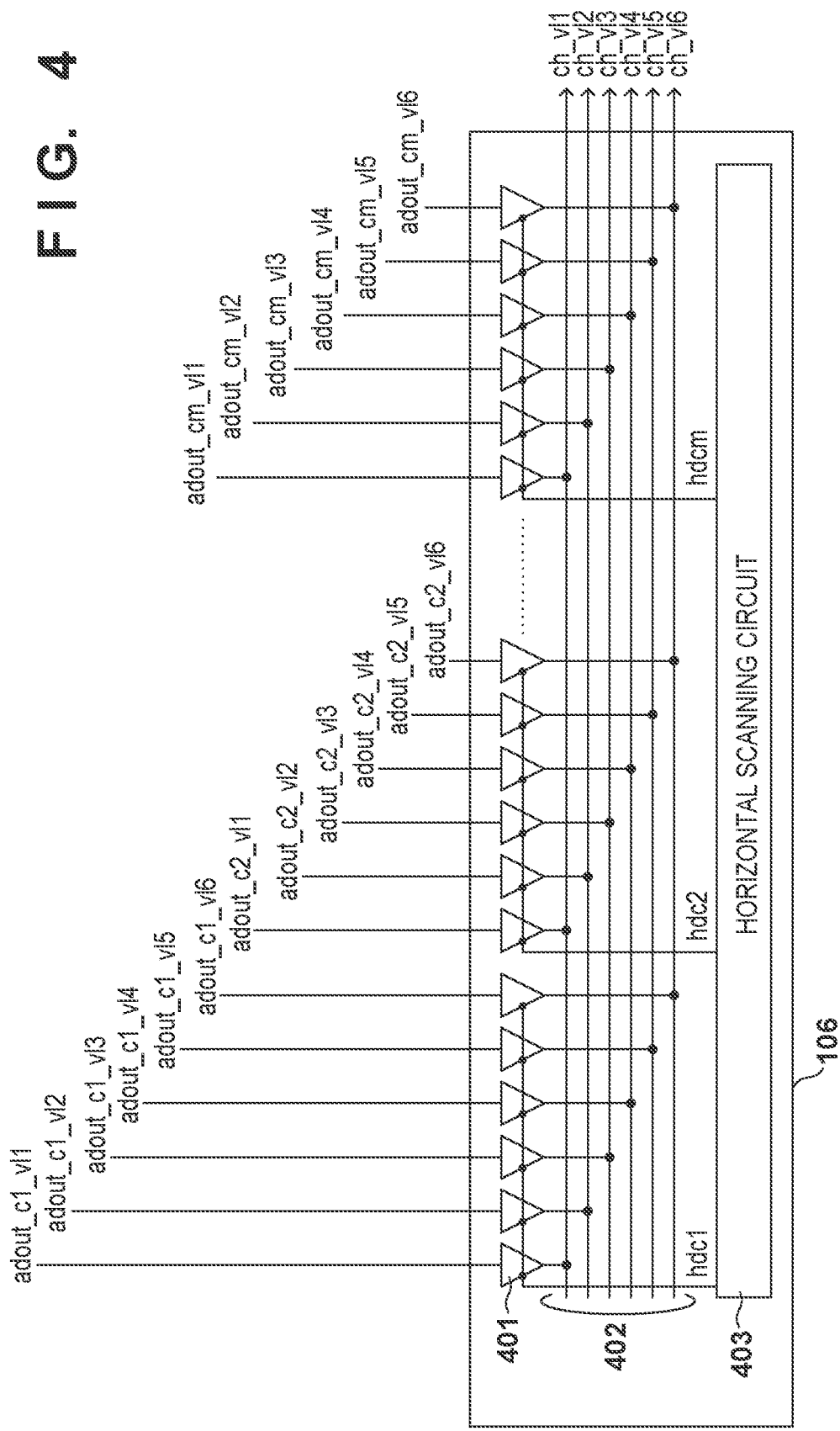
FIG. 4 is a block diagram showing an example of the arrangement of a horizontal transmitter of the photoelectric conversion apparatus according to the first embodiment.

FIG. 4 shows an example of the arrangement of the horizontal transmitter (transmitter) 106. The horizontal transmitter (transmitter) 106 can include, for example, a plurality of three-state buffers 401, a plurality (I lines) of horizontal transmission lines 402, and a horizontal scanning circuit 403. Outputs adout_cM_vl# (M: 1 to m) (#: 1 to 6) from the plurality of hold circuits 204 of the A/D converter 105 are provided to the input terminals of the corresponding three-state buffers 401. The output terminal of each of the plurality of three-state buffers 401 is connected to a corresponding horizontal transmission line 402 of the plurality of horizontal transmission lines 402. The horizontal scanning circuit 403 controls the outputs from the plurality of three-state buffers 401. Each three-state buffer 401 includes a control terminal, and a control signal can be applied to the control terminal to switch between a state for outputting an output signal of the same logic level as a high-level input signal or a low-level input signal and a state for maintaining the output terminal in a high impedance state.

The plurality of the horizontal transmission lines 402 can be discriminated from each other as horizontal transmission lines ch_vl1, ch_vl2, ch_vl3, ch_vl4, ch_vl5, and ch_vl6. The output adout_cM_vl1 is transmitted to the horizontal transmission line ch_vl1 via the corresponding three-state buffer 401, and the output adout_cM_vl2 is transmitted to the horizontal transmission line ch_vl2 via the corresponding three-state buffer 401. The outputs adout_cM_vl3, adout_cM_vl4, adout_cM_vl5, and adout_cM_vl6 are also transmitted to the horizontal transmission lines ch_vl3, ch_vl4, ch_vl5, and ch_vl6, respectively, via the corresponding three-state buffers 401.

Figure 5:
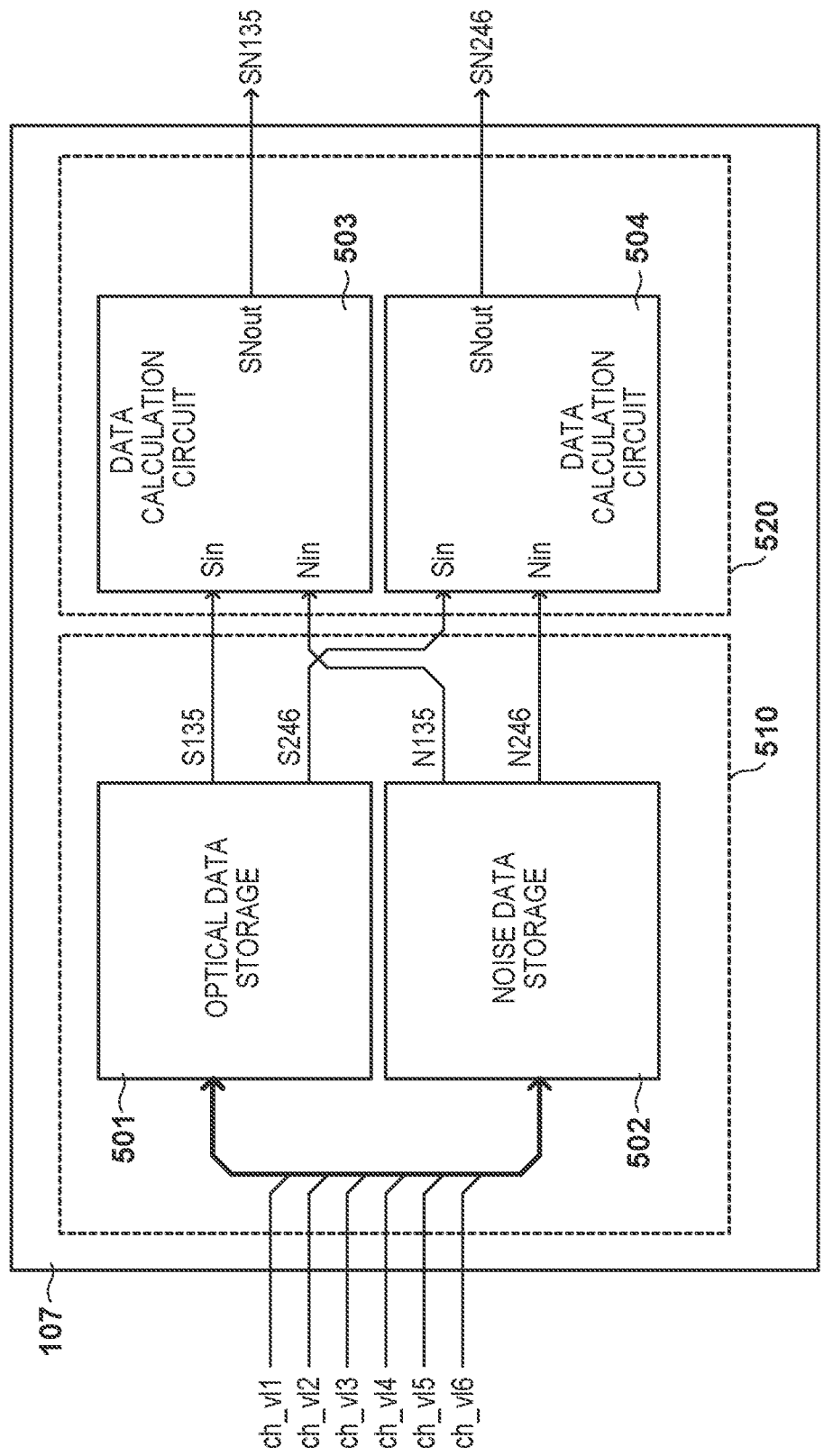
FIG. 5 is a block diagram showing an example of the arrangement of a data processor of the photoelectric conversion apparatus according to the first embodiment.

FIG. 5 shows an example of the arrangement of the data processor 107. The data processor 107 can include a data hold circuit 510 and a calculation circuit 520. I lines (that is, I channels) of the horizontal transmission lines ch_vl1, ch_vl2, ch_vl3, ch_vl4, ch_vl5, and ch_vl6 are connected to the input terminal of the data hold circuit 510. Hence, the horizontal transmitter 106 can operate so as to transmit the data converted by the plurality of A/D converters 203 to the data hold circuit 510. More specifically, the horizontal transmitter 106 can operate so as to transmit the noise data converted by the plurality of A/D converters 203 to the data hold circuit 510 and to subsequently transmit the optical data converted by the plurality of A/D converters 203 to the data hold circuit 510.

The data hold circuit 510 sequentially receives and holds pixel data (the noise data or the optical data) of I rows. The data hold circuit 510 also outputs J (second number of) noise data and J (second number of) optical data through J channels which are arranged in parallel to each other. Assume that J (second number) is a natural number equal to I (first number) or smaller than I (first number), and J=2 in the first embodiment. The data hold circuit 510 can include a noise data storage 502 which receives and holds I (6) noise data and an optical data storage 501 which receives and holds I (6) optical data. The noise data storage 502 outputs J (2) noise data and the optical data storage 501 outputs J (2) optical data in parallel to the outputs from the noise data storage.

In this case, an operation in which a given device (for example, the noise data storage 502) receives and holds data can be understood as an operation to write data to the device. Also, an operation in which a given device (for example, the noise data storage 502) outputs data can be understood as an operation to read out data from the device. The data write operation and the data read operation can be controlled by a write signal write_en and a read signal read_en generated by the controller 102.

The calculation circuit 520 can include a first data calculation circuit 503 and a second data calculation circuit 504. Each of the first data calculation circuit 503 and the second data calculation circuit 504 can calculate a difference between the optical data and the noise data. The noise data storage 502 includes two output ports N135 and N246. The output port N135 is connected to an input port Nin of the first data calculation circuit 503, and the output port N246 is connected to the input port Nin of the second data calculation circuit 504. The optical data storage 501 includes two output ports S135 and S246. The output port S135 is connected to an input port Sin of the first data calculation circuit 503, and the output port S246 is connected to the input port Sin of the second data calculation circuit 504.

The noise data of the first, third, and fifth channels provided to the noise data storage 502 via the horizontal transmission lines ch_vl1, ch_vl3, and ch_vl5 of the first, third, and fifth channels are output to the output port N135. The noise data of the second, fourth, and sixth channels provided to the noise data storage 502 via the horizontal transmission lines ch_vl2, ch_vl4, and ch_vl6 of the second, fourth, and sixth channels are output to the output port N246. The optical data of the first, third, and fifth channels provided to the optical data storage 501 via the horizontal transmission lines ch_vl1, ch_vl3, and ch_vl5 of the first, third, and fifth channels are output to the output port S135. The optical data of the second, fourth, and sixth channels provided to the optical data storage 501 via the horizontal transmission lines ch_vl2, ch_vl4, and ch_vl6 of the second, fourth, and sixth channels are output to the output port S246.

The I lines of horizontal transmission lines ch_vl# (#: 1 to 6) can be supplied to both the noise data storage 502 and the optical data storage 501. The first data calculation circuit 503 calculates the difference between each optical data of the first, third, and fifth channels provided to the input port Sin and the corresponding noise data of the first, third, and fifth channels provided to the input port Nin. Subsequently, the first data calculation circuit 503 outputs the calculation results of the first, third, and fifth channels to an output port SNout. The second data calculation circuit 504 calculates the difference between each optical data of the second, fourth, and sixth channels input to the input port Sin and the corresponding noise data of the second, fourth, and sixth channels input to the input port Nin. Subsequently, the second data calculation circuit 504 outputs the calculation results of the second, fourth, and sixth channels to the output port SNout.

For example, each of the data calculation circuits 503 and 504 can be arranged to perform calculation as $$SNout = Sin - Nin \qquad (1)$$

However, it may be arranged so that another calculation will be performed.

Figure 6:
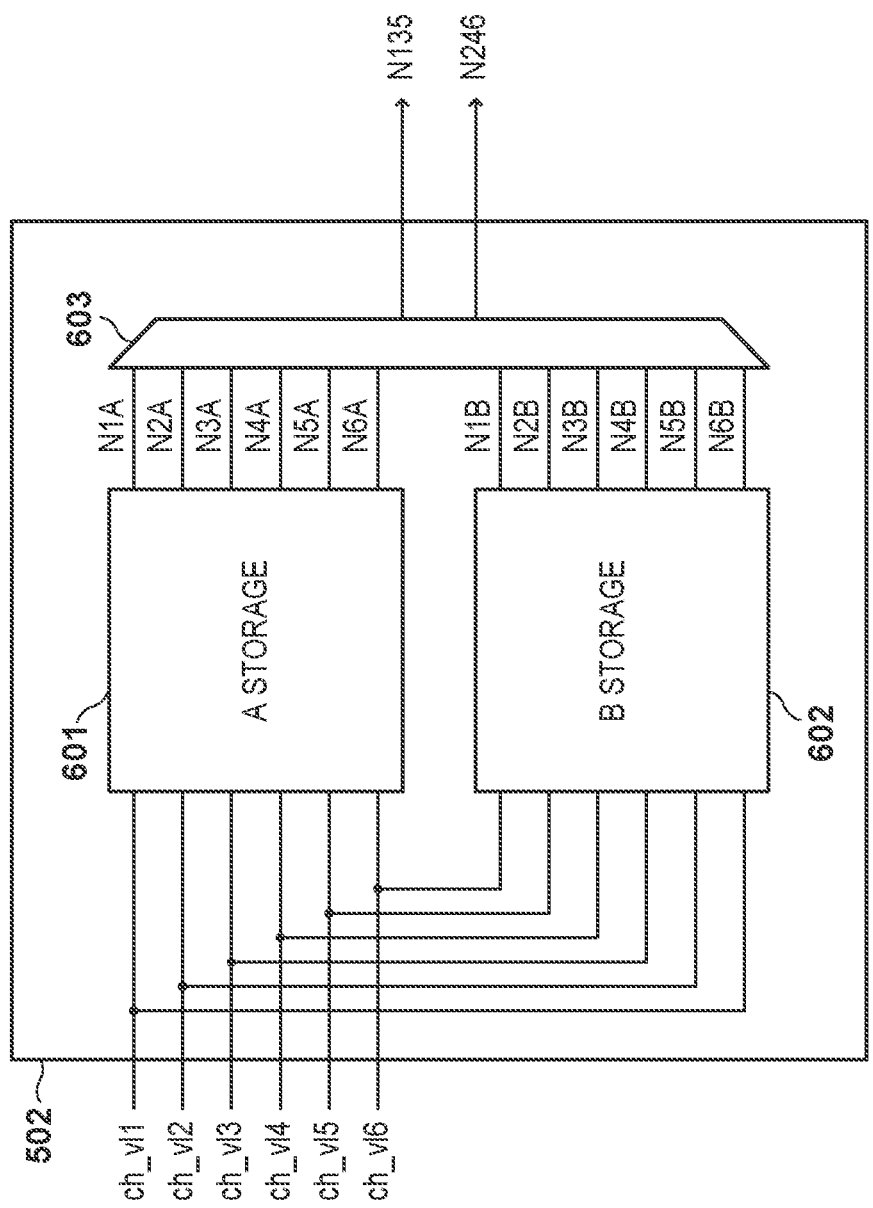
FIG. 6 is a block diagram showing an example of the arrangement of a noise data storage of the photoelectric conversion apparatus according to the first embodiment.

FIG. 6 shows an example of the arrangement of the noise data storage 502 shown in FIG. 5. The noise data storage 502 can include, for example, an A storage (first storage) 601, a B storage (second storage) 602, and a selector 603. Each of the A storage 601 and the B storage 602 can hold pixels of I rows (pixels of the first number of rows), that is, (I×m) pixel data. The horizontal transmission lines ch_vl# (#: 1 to 6) are connected to the input terminals of the noise data storage 502, and the horizontal transmission lines ch_vl# (#: 1 to 6) are connected to the input terminals of both the A storage 601 and the B storage 602. Output signals N#A (#: 1 to 6) output from the output terminal of the A storage 601 and output signals N#B (#: 1 to 6) output from the output terminal of the B storage 602 are supplied to the selector 603.

The selector 603 includes output ports SN135 and SN246. The selector 603 selects one of the output signals N1A, N3A, N5A, N1B, N3B, and N5B and outputs the selected output signal to the output port SN135. The selector 603 selects one of the output signals N2A, N4A, N6A, N2B, N4B, and N6B and outputs the selected output signal to the output port SN246.

The A storage 601 and the B storage 602 can be formed by, for example, separate SRAMs which can be accessed independently of each other. Each of the A storage 601 and the B storage 602 can be formed by, for example, an aggregate of storage elements such as flip-flops or can be formed of an aggregate of other storage elements. The optical data storage 501 can have an arrangement similar to that of the noise data storage 502. The optical data storage 501 can include, for example, an A storage similar to the A storage 601, a B storage similar to the B storage 602, and a selector similar to the selector 603.

Figure 7B:
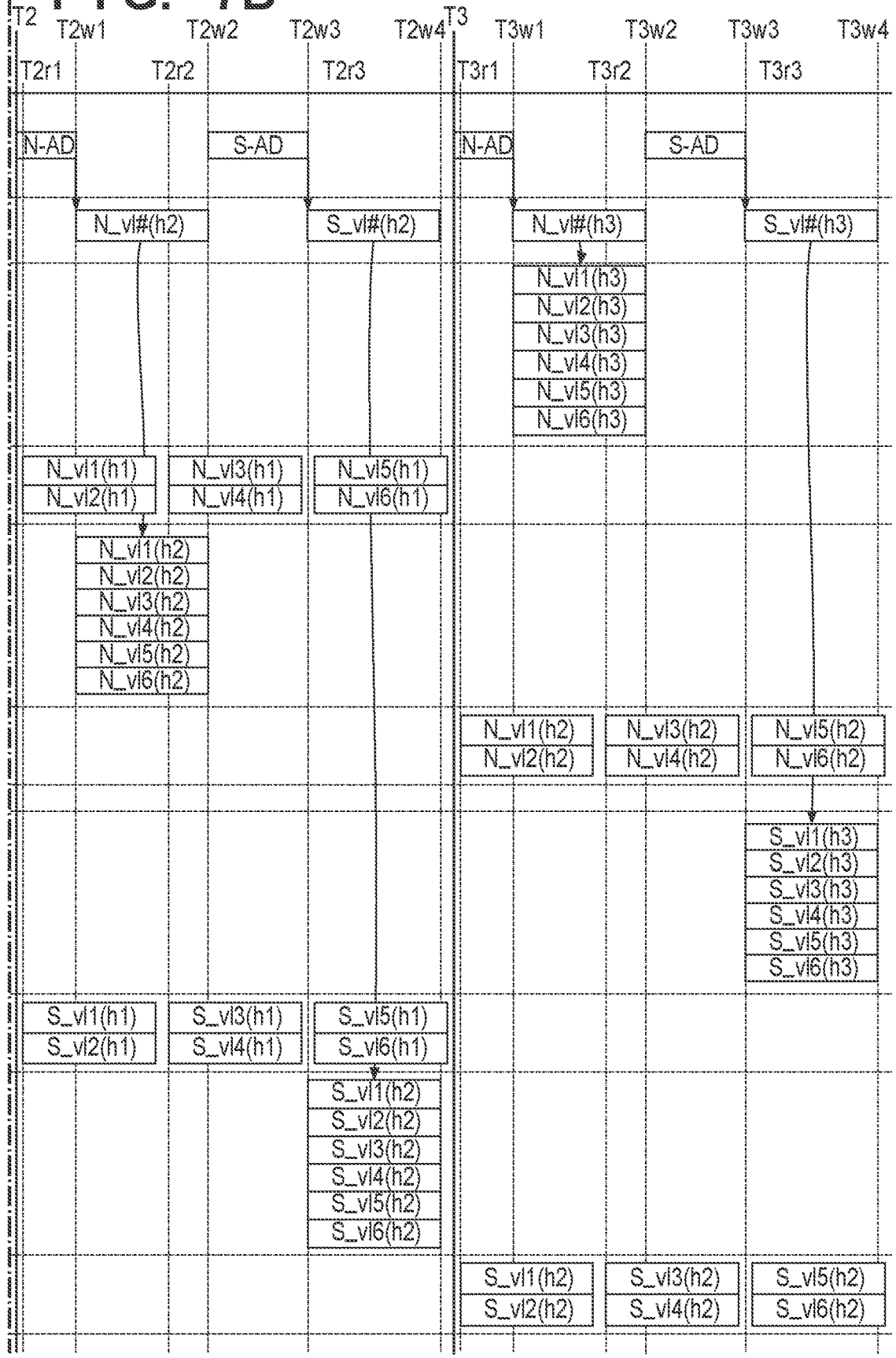

An operation method of the photoelectric conversion apparatus 1 according to the first embodiment will be described hereinafter. FIGS. 7A and 7B show the operation method of the photoelectric conversion apparatus 1 according to the first embodiment. In FIGS. 7A and 7B, "A/D conversion" indicates the operation of the A/D converter 105, "horizontal transmission" indicates the operation of the horizontal transmitter 106, "noise data storage" indicates the operation of the noise data storage 502, and "optical data storage" indicates the operation of the optical data storage 501. The photoelectric conversion apparatus 1 according to the first embodiment performs simultaneous A/D conversion of the noise signals of the pixels of the six rows pixels, and subsequently performs simultaneous A/D conversion of the optical signals of the pixels of the six rows. In addition, the photoelectric conversion apparatus 1 outputs the pixel data (the difference between the optical data and the noise data) of two rows in parallel and sequentially outputs, pixel by pixel, the data of the pixels of each row.

First, an operation in which the A/D converter 105 generates noise data by performing A/D conversion on the noise signals of the pixels P of the first row to the sixth row and the first column to the mth column, and the generated noise data are written in the A storage 601 of the noise data storage 502 of the data processor 107 will be described. At time T1, the CPU 101 outputs a horizontal synchronization signal HD to the controller 102. From time T1 to time T1w1, the plurality (m×I) of A/D converters 203 of the A/D converter 105 simultaneously perform A/D conversion of the noise signals of the pixels P of the first row to the sixth row and the first column to the mth column to generate noise data under the control of the controller 102. At time T1w1, the plurality (m×I) of noise data generated by the plurality (m×I) of A/D converters 203 are transmitted at once to the corresponding plurality (m×I) of hold circuits 204. In this case, assume that N_vl1(h1) is a noise data group of the first row, N_vl2(h1) is a noise data group of the second row, . . . , and N_vl6(h1) is a noise data group of the sixth row.

Figure 8:
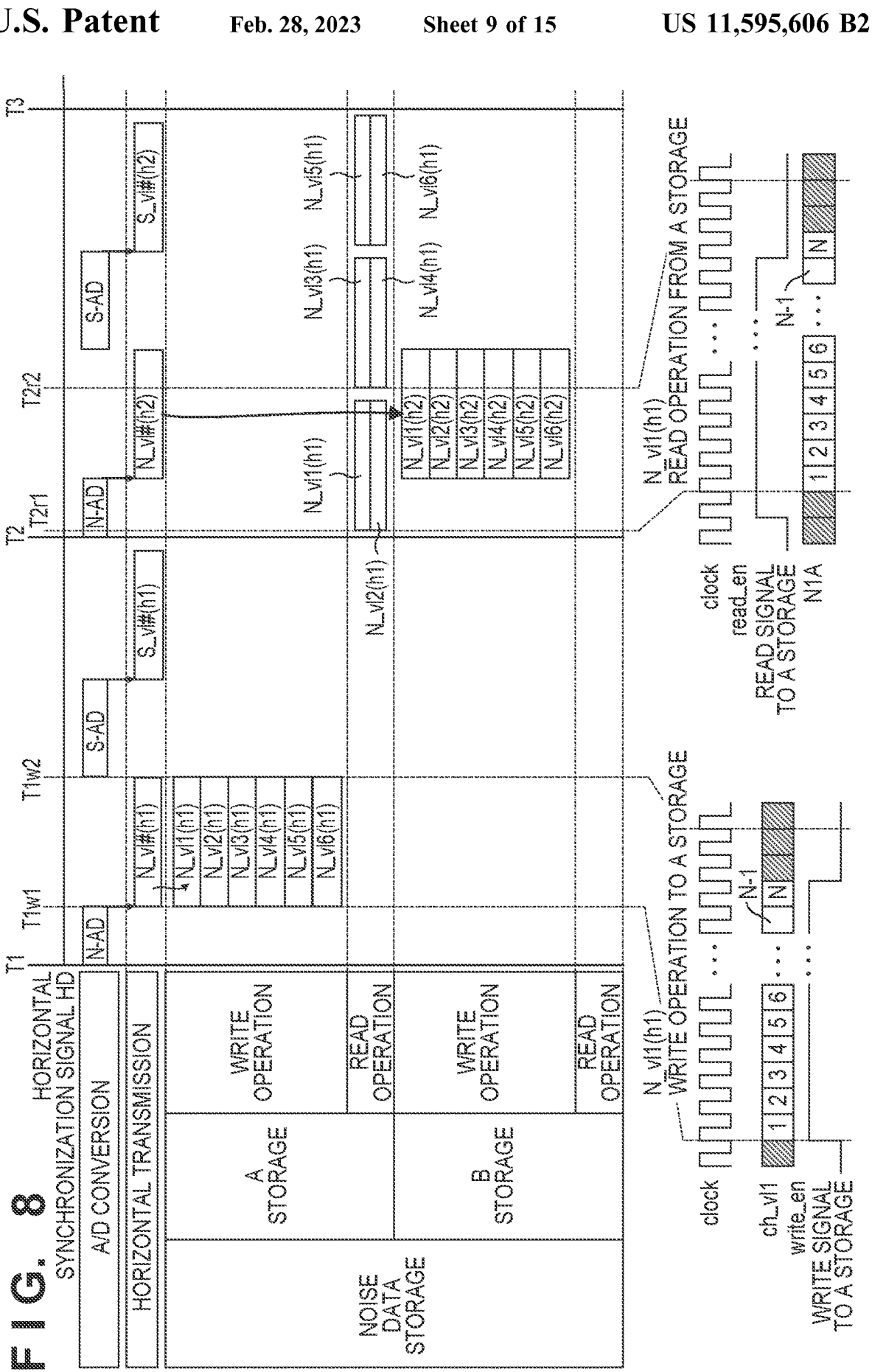
FIG. 8 is a timing chart showing an example of another operation of the photoelectric conversion apparatus according to the first embodiment.

From time T1w1 to time T1w2, the noise data groups N_vl#(h1) (#: 1 to 6) held by the plurality of hold circuits 204 are transmitted to the data processor 107 via the horizontal transmitter 106. The noise data groups of the six rows are transmitted in parallel and the data of the noise data group of the pixels of each row are sequentially transmitted, pixel by pixel, to the data processor 107. The data of the noise data group N_vl1(h1) transmitted to the data processor 107 are sequentially written in the A storage 601 of the noise data storage 502 in accordance with the write signal write_en and a write clock signal clock generated by the controller 102. The operation to write the noise data group N_vl1(h1) in the A storage 601 is illustrated in a timing chart shown at the lower left of FIG. 8.

An operation in which the A/D converter 105 generates optical data by performing A/D conversion on the optical signals of the pixels P of the first row to the sixth row and the first column to the mth column, and the generated optical data are written in the A storage of the optical data storage 501 of the data processor 107 will be described. From time T1w2 to time T1w3, the plurality (m×I) of A/D converters 203 of the A/D converter 105 simultaneously perform A/D conversion of the optical signals of the pixels P of the first row to the sixth row and the first column to the mth column to generate optical data under the control of the controller 102. At time T1w3, the plurality (m×I) of optical data generated by the plurality (m×I) of A/D converters 203 are transmitted at once to the corresponding plurality (m×I) of hold circuits 204. In this case, assume that S_vl1(h1) is an optical data group of the first row, S_vl2(h1) is an optical data group of the second row, . . . , and S_vl6(h1) is an optical data group of the sixth row.

From time T1w3 to time T1w4, the optical data groups S_vl#(h1) (#: 1 to 6) held by the plurality of hold circuits 204 are transmitted to the data processor 107 via the horizontal transmitter 106. The optical data groups of the six rows are transmitted in parallel and the data of the optical data group of the pixels of each row are sequentially transmitted, pixel by pixel, to the data processor 107. The optical data groups transmitted to the data processor 107 are sequentially written in the A storage of the optical data storage 501 in accordance with the write signal write_en and the write clock signal clock generated by the controller 102.

An operation to read out the noise data and the optical data of the pixels P of the first row to the sixth row and the first column to the mth column from the noise data storage 502 (the A storage 601) and the optical data storage 501 (the A storage) of the data processor 107 will be described hereinafter. At time T2, the CPU 101 outputs the horizontal synchronization signal HD to the controller 102. From time T2r1 to time T2r2, the noise data group N_vl1(h1) of the first row and the noise data group N_vl2(h1) of the second row are read out in parallel and the data of the noise data group of each row are sequentially read out pixel by pixel from the A storage 601 of the noise data storage 502. Also, in parallel to this operation, from time T2r1 to time T2r2, the optical data group S_vl1(h1) of the first row and the optical data group S_vl2(h1) of the second row are read out in parallel and the data of the optical data group of each row are sequentially read out pixel by pixel from the A storage of the optical data storage 501. In addition, from time T2r1 to time T2r2, the difference between the optical data and the noise data is calculated for each pixel in each of the first row and the second row by the calculation circuit 520, and the data of the calculated difference are output from the signal output circuit 108. The operation to read out the noise data group N_vl1(h1) from the A storage 601 is illustrated in a timing chart shown at the lower right of FIG. 8.

In a manner similar to the above-described operation, from time T2r2 to time T2r3, the difference between the optical data and the noise data is calculated for each pixel in each of the third row and the fourth row by the calculation circuit 520, and the data of the calculated difference are output from the signal output circuit 108. In addition, from time T2r3 to time T3r1, the difference between the optical data and the noise data is calculated for each pixel in each of the fifth row and the sixth row by the calculation circuit 520, and the data of the calculated difference are output from the signal output circuit 108.

A/D conversion is simultaneously performed on the noise signals of the pixels of the first row to the sixth row, and subsequently, A/D conversion is simultaneously performed on the optical signals of the first row to the sixth row in the manner described above. In addition, the pixel data (the data of the difference between the optical data and the noise data) of two rows are output in parallel, and the data of the pixels of each row are sequentially output pixel by pixel.

An operation in which the A/D converter 105 generates noise data by performing A/D conversion on the noise signals of the pixels P of the seventh row to the 12th row and the first column to the mth column, and the generated noise data are written in the B storage 602 of the noise data storage 502 of the data processor 107 will be described. From time T2 to time T2w1, the plurality (m×I) of A/D converters 203 of the A/D converter 105 simultaneously perform A/D conversion of the noise signals of the pixels P of the seventh row to the 12th row and the first column to the mth column to generate noise data under the control of the controller 102. At time T2w1, the plurality (m×I) of noise data generated by the plurality (m×I) of A/D converters 203 are transmitted at once to the corresponding plurality (m×I) of hold circuits 204. In this case, assume that N_vl1(h2) is a noise data group of the seventh row, N_vl2(h2) is a noise data group of the eighth row, . . . , and N_vl6(h2) is a noise data group of the 12th row.

From time T2w1 to time T2w2, the noise data groups N_vl#(h2) (#: 1 to 6) held by the plurality of hold circuits 204 are transmitted to the data processor 107 via the horizontal transmitter 106. The noise data groups of the six rows are transmitted in parallel and the data of the noise data group of the pixels of each row are sequentially transmitted, pixel by pixel, to the data processor 107. The noise data groups N_vl#(h2) (#: 1 to 6) transmitted to the data processor 107 are written in the B storage 602 of the noise data storage 502 in accordance with the write signal write_en and the write clock signal clock generated by the controller 102.

An operation in which the A/D converter 105 generates optical data by performing A/D conversion on the optical signals of the pixels P of the seventh row to the 12th row and the first column to the mth column, and the generated optical data are written in the B storage of the optical data storage 501 of the data processor 107 will be described. From time T2w2 to time T2w3, the plurality (m×I) of A/D converters 203 of the A/D converter 105 simultaneously perform A/D conversion of the optical signals of the pixels P of the seventh row to the 12th row and the first column to the mth column to generate optical data under the control of the controller 102. At time T2w3, the plurality (m×I) of optical data generated by the plurality (m×I) of A/D converters 203 are transmitted at once to the corresponding plurality (m×I) of hold circuits 204. In this case, assume that S_vl1(h2) is an optical data group of the seventh row, S_vl2(h2) is an optical data group of the eighth row, . . . , and S_vl6(h2) is an optical data group of the 12th row.

From time T2w3 to time T2w4, the optical data groups S_vl#(h2) (#: 1 to 6) held by the plurality of hold circuits 204 are transmitted to the data processor 107 via the horizontal transmitter 106. The optical data groups of the six rows are transmitted in parallel and the data of the optical data group of the pixels of each row are sequentially transmitted, pixel by pixel, to the data processor 107. The optical data groups S_vl#(h2) (#: 1 to 6) transmitted to the data processor 107 are sequentially written in the B storage of the optical data storage 501 in accordance with the write signal write_en and the write clock signal clock generated by the controller 102.

An operation to read out the noise data and the optical data of the pixels P of the seventh row to the 12th row and the first column to the mth column from the noise data storage 502 (the B storage 602) and the optical data storage 501 (the B storage) of the data processor 107 will be described hereinafter. At time T3, the CPU 101 outputs the horizontal synchronization signal HD to the controller 102. From time T3r1 to time T3r2, the noise data group N_vl1(h2) of the seventh row and the noise data group N_vl2(h2) of the eighth row are read out in parallel and the data of the noise data group of each row are sequentially read out pixel by pixel from the B storage 602 of the noise data storage 502. Also, in parallel to this operation, from time T3r1 to time T3r2, the optical data group S_vl1(h2) of the seventh row and the optical data group S_vl2(h2) of the eighth row are read out and the data of the optical data group of each row are sequentially read out, pixel by pixel, from the B storage of the optical data storage 501. In addition, from time T3r1 to time T3r2, the difference between the optical data and the noise data is calculated for each pixel in each of the seventh row and the eighth row by the calculation circuit 520, and the data of the calculated difference are output from the signal output circuit 108.

In a manner similar to the above-described operation, from time T3r2 to time T3r3, the difference between the optical data and the noise data is calculated for each pixel in each of the ninth row and the tenth row by the calculation circuit 520, and the data of the calculated difference are output from the signal output circuit 108. In addition, from time T3r3 to time T4r1, the difference between the optical data and the noise data is calculated for each pixel in each of the 11th row and the 12th row by the calculation circuit 520, and the data of the calculated difference are output from the signal output circuit 108. Subsequently, the operation using the A storage and the operation using the B storage will be performed alternately and in parallel to each other.

As described above, in the photoelectric conversion apparatus 1 according to the first embodiment, the A/D conversion of the noise signals of the pixels of the I rows is simultaneously preformed, and subsequently, the A/D conversion of the optical signals of the pixels of the I rows is simultaneously performed. As a result, the requested function of the A/D converter 105 can simplified. Also, in the photoelectric conversion apparatus 1 according to the first embodiment, the pixel data (the difference between the optical data and the noise data) of J rows can be output in parallel through J channels which are arranged in parallel to each other, and the data of the pixels of each row can be sequentially output pixel by pixel. Such an arrangement is advantageous in reducing the circuit scale of the data processor 107. Assume that I≥J in this case.

In the first embodiment, the pixel data of each row is supplied to the data processor 107 by horizontal transmission at a rate of one pixel per clock cycle, and the pixel data of each row is output from the data processor 107 at a rate of one pixel per clock cycle. The data processor 107 can access each storage in a simple manner in the first embodiment.

In the second embodiment, the pixel data of each row is supplied to a data processor 107 by horizontal transmission at a rate of one pixel per clock cycle, and the pixel data of each row is output from the data processor 107 at a rate of two pixels per clock cycle. A photoelectric conversion apparatus 1 according to the second embodiment will be described with reference to FIGS. 9, 10, 11, and 12. Matters not mentioned in the second embodiment can follow those of the first embodiment. A pixel array 104, the arrangement of an A/D converter 105 (FIG. 2), the arrangement of a pixel P (FIG. 3), and the arrangement of a horizontal transmitter 106 (FIG. 4) in the photoelectric conversion apparatus 1 according to the second embodiment can be similar to those of the first embodiment.

Figure 9:
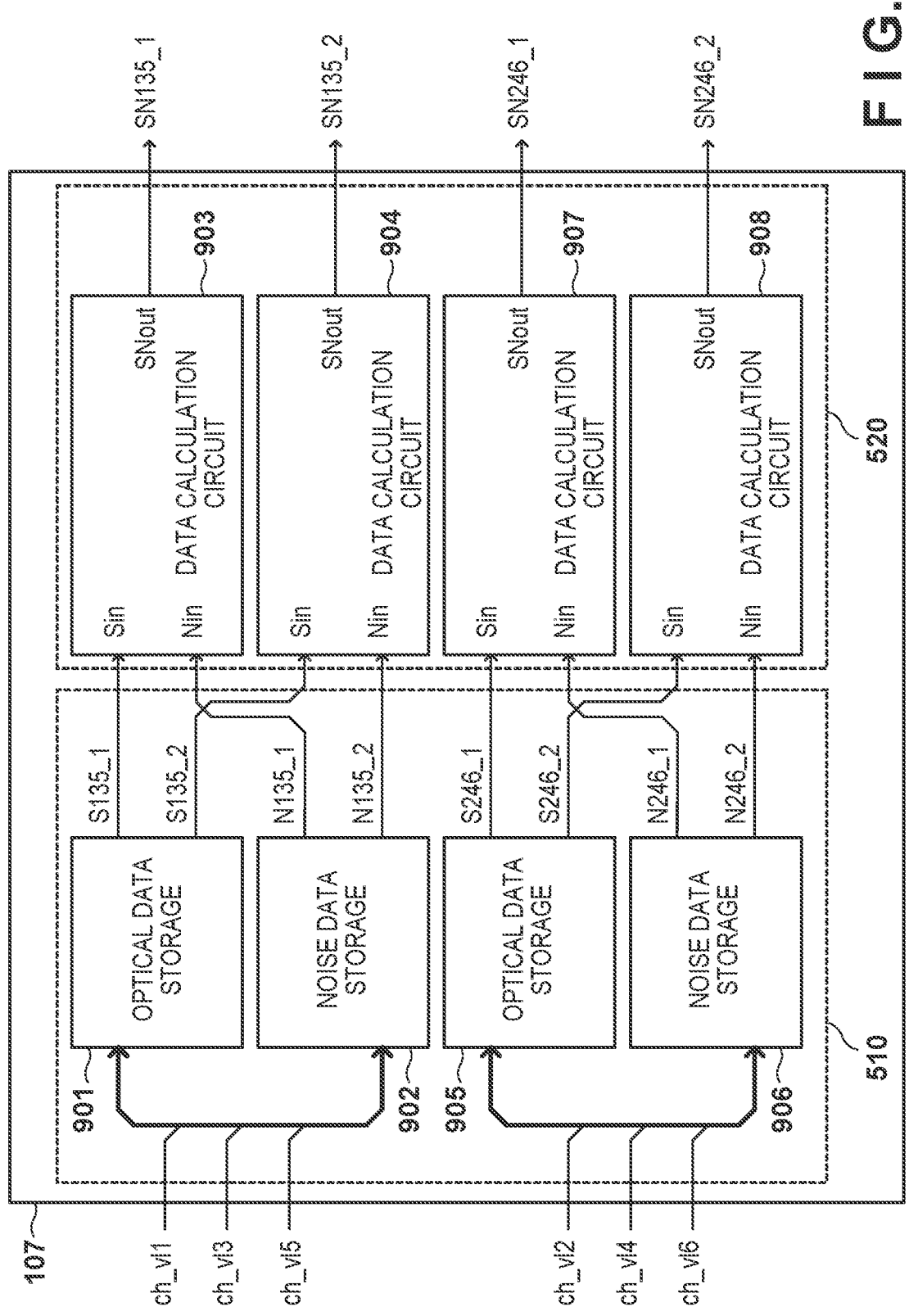
FIG. 9 is a block diagram showing an example of the arrangement of a data processor of a photoelectric conversion apparatus according to the second embodiment.

FIG. 9 shows an example of the arrangement of the data processor 107 according to the second embodiment. The data processor 107 can include a data hold circuit 510 and a calculation circuit 520. I lines (that is, I channels) of horizontal transmission lines ch_vl1, ch_vl2, ch_vl3, ch_vl4, ch_vl5, and ch_vl6 are connected to the input terminal of the data hold circuit 510. More specifically, the horizontal transmitter 106 can operate so as to transmit the noise data converted by a plurality of A/D converters 203 to the data hold circuit 510 and to subsequently transmit the optical data converted by the plurality of A/D converters 203 to the data hold circuit 510.

The data hold circuit 510 sequentially receives and holds data (the noise data or the optical data) of I rows. The data hold circuit 510 also outputs J (second number of) noise data and J (second number of) optical data through J channels which are arranged in parallel to each other. Assume that J (second number) is a natural number equal to I (first number) or smaller than I (first number) in this case. I=6 and J=2 in the second embodiment as well. The data hold circuit 510 includes a noise data storage 902 which receives and holds the number of noise data equal to the pixels of I rows and a noise data storage 906 which receives and holds the number of noise data equal to the pixels of I rows. The data hold circuit 510 also includes an optical data storage 901 which receives and holds the number of optical data equal to the pixels of I rows and an optical data storage 905 which receives and holds the number of optical data equal to the pixels of I rows. The calculation circuit 520 can include a first data calculation circuit 903, a second data calculation circuit 904, a third data calculation circuit 907, and a fourth data calculation circuit 908. The first data calculation circuit 903, the second data calculation circuit 904, the third data calculation circuit 907, and the fourth data calculation circuit 908 calculate the difference between the optical data and the noise data.

The data processor 107 includes an input terminal to which the horizontal transmission lines ch_vl1, ch_vl2, ch_vl3, ch_vl4, ch_vl5, and ch_vl6 of the first, second, third, fourth, fifth, and sixth channels, respectively, are connected. The horizontal transmission lines ch_vl1, ch_vl3, and ch_vl5 of the first, third, and fifth channels, respectively, are connected to the input terminals of the optical data storage 901 and the noise data storage 902.

The optical data storage 901 includes output ports S135_1 and S135_2. The output port S135_1 is connected to an input port Sin of the first data calculation circuit 903, and the output port S135_2 is connected to the input port Sin of the second data calculation circuit 904. The optical data of the first, third, and fifth channels provided to the optical data storage 901 via the horizontal transmission lines ch_vl1, ch_vl3, and ch_vl5 of the first, third, and fifth channels are output to the output ports S135_1 and S135_2. The noise data storage 902 includes output ports N135_1 and N135_2. The output port N135_1 is connected to an input port Nin of the first data calculation circuit 903, and the output port N135_2 is connected to the input port Nin of the second data calculation circuit 904. The optical data of the first, third, and fifth channels provided to the noise data storage 902 via the horizontal transmission lines ch_vl1, ch_vl3, and ch_vl5 of the first, third, and fifth channels are output to the output ports N135_1 and N135_2.

The first data calculation circuit 903 calculates the difference between the optical data supplied from the output port S135_1 to the input port Sin and the noise data supplied from the output port N135_1 to the input port Nin, and outputs the calculation result to an output port SN135_1. The second data calculation circuit 904 calculates the difference between the optical data supplied from the output port S135_2 to the input port Sin and the noise data supplied from the output port N135_2 to the input port Nin, and outputs the calculation result to an output port SN135_2.

The optical data storage 905 includes output ports S246_1 and S246_2. The output port S246_1 is connected to the input port Sin of the third data calculation circuit 907, and the output port S246_2 is connected to the input port Sin of the fourth data calculation circuit 908. The optical data of the second, fourth, and sixth channels provided to the optical data storage 905 via the horizontal transmission lines ch_vl2, ch_vl4, and ch_vl6 of the second, fourth, and sixth channels are output to the output ports S246_1 and S246_2. The noise data storage 906 includes output ports N246_1 and N246_2. The output port N246_1 is connected to the input port Nin of the third data calculation circuit 907, and the output port N246_2 is connected to the input port Nin of the fourth data calculation circuit 908. The optical data of the second, fourth, and sixth channels provided to the noise data storage 906 via the horizontal transmission lines ch_vl2, ch_vl4, and ch_vl6 of the second, fourth, and sixth channels are output to the output ports N246_1 and N246_2.

The third data calculation circuit 907 calculates the difference between the optical data supplied from the output port S246_1 to the input port Sin and the noise data supplied from the output port N246_1 to the input port Nin, and outputs the calculation result to an output port SN246_1. The fourth data calculation circuit 908 calculates the difference between the optical data supplied from the output port S246_2 to the input port Sin and the noise data supplied from the output port N246_2 to the input port Nin, and outputs the calculation result to an output port SN246_2.

For example, each of the data calculation circuits 903, 904, 905, and 906 can be arranged to perform calculation as $$SNout = Sin - Nin \tag{1}$$

However, it may be arranged so that another calculation will be performed.

Figure 10:
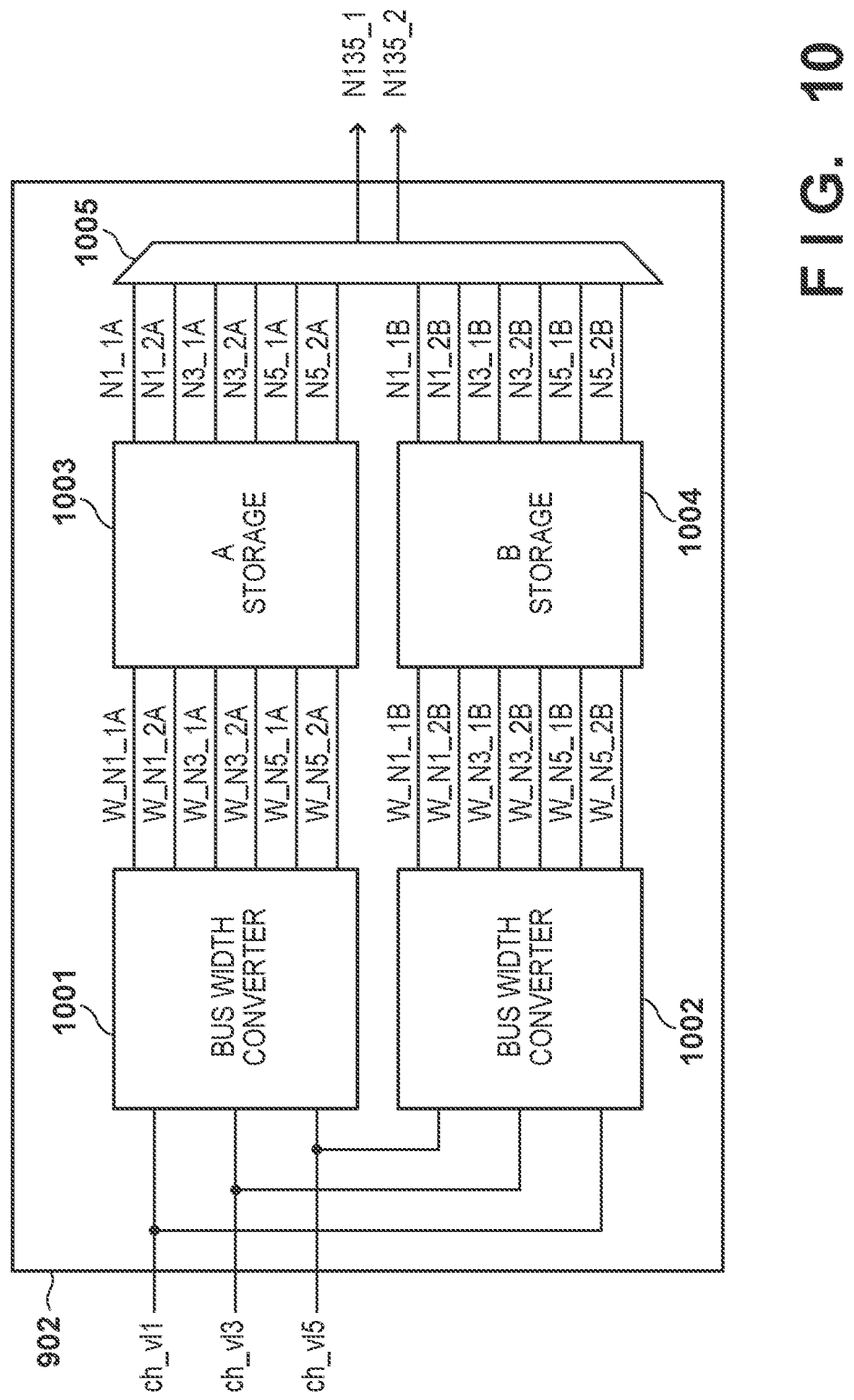
FIG. 10 is a block diagram showing an example of the arrangement of a noise data storage of the photoelectric conversion apparatus according to the second embodiment.

FIG. 10 shows an example of the arrangement of the noise data storage 902 shown in FIG. 9. The noise data storage 902 can include bus width converters 1001 and 1002, an A storage 1003, a B storage 1004, and a selector 1005. The horizontal transmission lines ch_vl# (#: 1, 3, and 5) are connected to the input terminal of the noise data storage 902, and the horizontal transmission lines ch_vl# (#: 1, 3, and 5) are connected to the input terminals of both of the bus width converters 1001 and 1002.

The bus width converter 1001 receives half of the I (first number of) noise data twice and outputs the received data as I (first number of) noise data. In a similar manner, the bus width converter 1002 receives half of the I (first number of) noise data twice and outputs the received data as I (first number of) noise data. Output signals W_N#_1A and W_N#_2A (#: 1, 3, and 5) output from the output terminal of the bus width converter 1001 are supplied to the A storage 1003. Output signals W_N#_1B and W_N#_2B (#: 1, 3, and 5) output from the output terminal of the bus width converter 1002 are supplied to the B storage 1004.

Output signals N#_1A and N#_2A (#: 1, 3, and 5) output from the output terminal of the A storage 1003 and output signals N#_1B and N#_2B (#: 1, 3, and 5) output from the output terminal of the B storage 1004 are supplied to the selector 1005. The selector 1005 includes the output ports N135_1 and N135_2. The selector 1005 selects one of the output signals N1_1A, N3_1A, N5_1A, N1_1B, N3_1B, and N5_1B as the output signal to be output from the output port N135_1. The selector 1005 also selects one of the output signals N1_2A, N3_2A, N5_2A, N1_2B, N3_2B, and N5_2B as the output signal to be output from the output port N135_2.

The A storage 1003 and the B storage 1004 can be formed by, for example, separate SRAMs which can be accessed independently of each other. Each of the A storage 1003 and the B storage 1004 can be formed by, for example, an aggregate of storage elements such as flip-flops or can be formed of an aggregate of other storage elements. The optical data storage 901 and the optical data storage 905 and the noise data storage 906 can have an arrangement similar to that of the noise data storage 902. Each of the bus width converters applied to the optical data storage 901 and the optical data storage 905 outputs I (first number of) optical data upon receiving half of I (first number of) optical data twice.

Figure 11A:
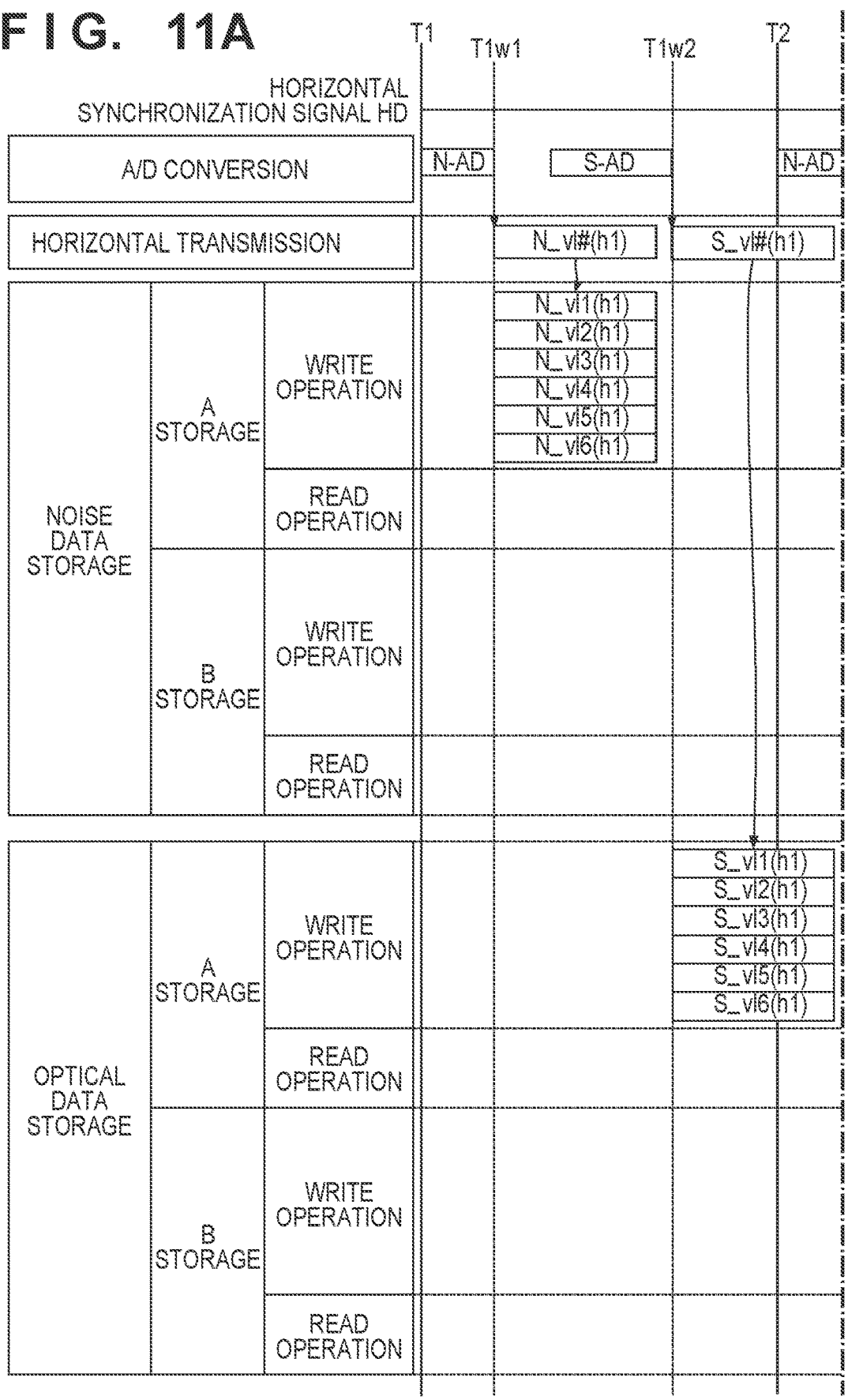
Figure 11B:
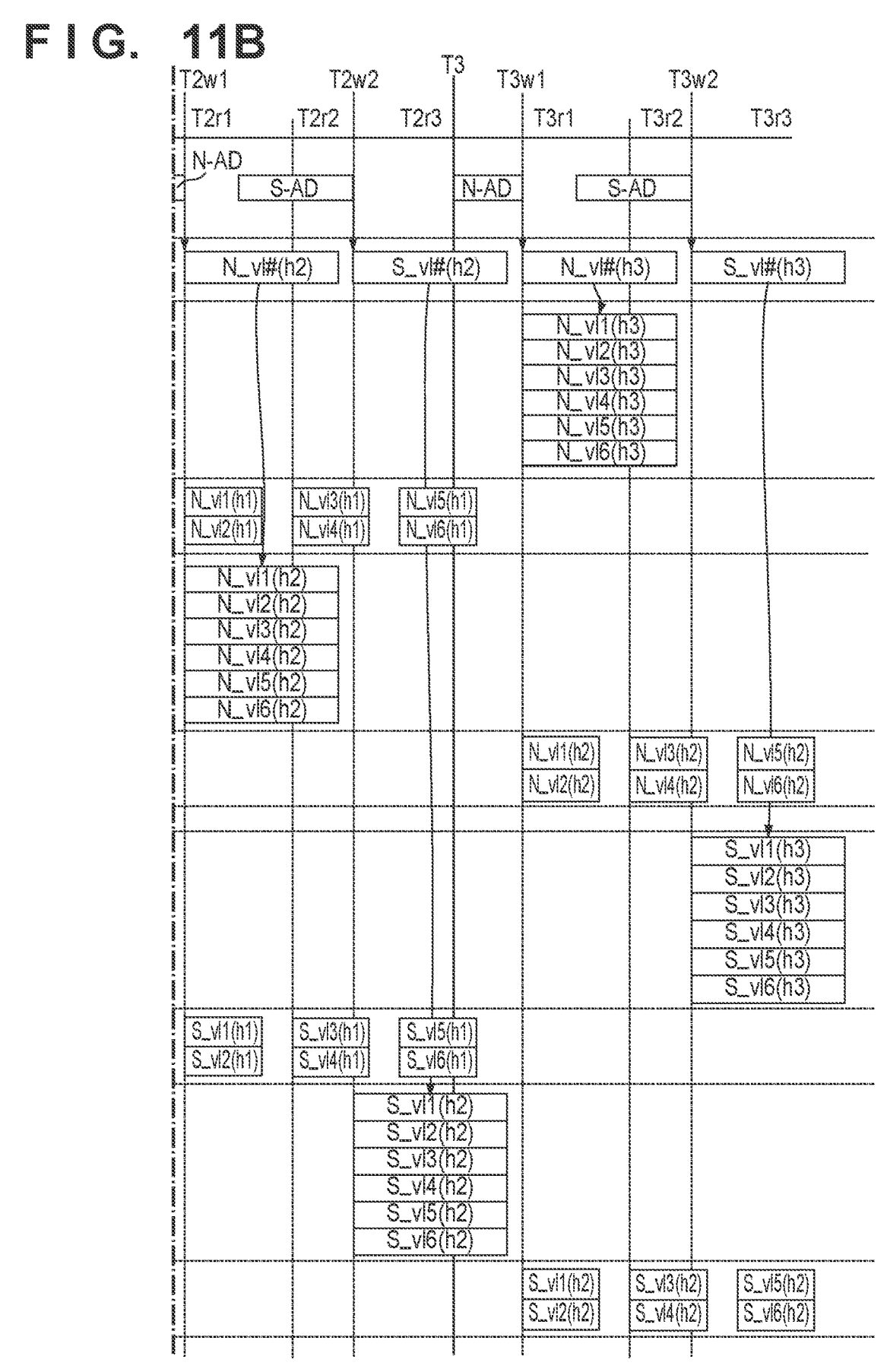

An operation method of the photoelectric conversion apparatus 1 according to the second embodiment will be described hereinafter. FIGS. 11A and 11B show the operation method of the photoelectric conversion apparatus 1 according to the second embodiment. In FIGS. 11A and 11B, "A/D conversion" indicates the operation of the A/D converter 105, "horizontal transmission" indicates the operation of the horizontal transmitter 106, "noise data storage" indicates the operation of the noise data storage 902 and the noise data storage 906, and "optical data storage" indicates the operation of the optical data storage 901 and the optical data storage 905. In FIGS. 11A and 11B, "A storage" of "noise data storage" collectively indicates the operations of the A storage of the noise data storage 902 and the A storage of the noise data storage 906, and "B storage" of "noise data storage" collectively indicates the operations of the B storage of the noise data storage 902 and the B storage of the noise data storage 906. In FIGS. 11A and 11B, "A storage" of "optical data storage" collectively shows the operations of the A storage of the optical data storage 901 and the A storage of the optical data storage 905, and "B storage" of "optical data storage" collectively indicates the operations of the B storage of the optical data storage 901 and the B storage of the optical data storage 905. The photoelectric conversion apparatus 1 according to the second embodiment performs simultaneous A/D conversion of the noise signals of the pixels of six rows, and subsequently performs simultaneous A/D conversion of the optical signals of the pixels of the six rows. In addition, the photoelectric conversion apparatus 1 according to the second embodiment outputs the pixel data (the difference between the optical data and the noise data) of two rows in parallel through two channels which are arranged in parallel to each other, and sequentially outputs the data of the pixels of each row by outputting data corresponding to two pixels at once.

First, an operation in which noise data is generated by performing A/D conversion on the noise signals of the pixels P of the first row to the sixth row and the first column to the mth column, and the generated noise data are written in the A storage of the data processor 107 will be described. At time T1, a CPU 101 outputs a horizontal synchronization signal HD to a controller 102. From time T1 to time T1$w$1, the plurality (m×I) of A/D converters 203 of the A/D converter 105 simultaneously perform A/D conversion of the noise signals of the pixels P of the first row to the sixth row and the first column to the mth column to generate noise data under the control of the controller 102. At time T1$w$1, the plurality (m×I) of noise data generated by the plurality (m×I) of A/D converters 203 are transmitted at once to the corresponding plurality (m×I) of hold circuits 204. In this case, assume that N_vl1($h$1) is a noise data group of the first row, N_vl2($h$1) is a noise data group of the second row, . . . , and N_vl6($h$1) is a noise data group of the sixth row.

From time T1$w$1 to time T1$w$2, the noise data groups N_vl#(h1) (#: 1 to 6) held by the plurality of hold circuits 204 are transmitted to the data processor 107 via the horizontal transmitter 106. The noise data groups N_vl#(h1) (#: 1 to 6) are written in the A storage of each of the noise data storage 902 and the noise data storage 906. The operation to write the noise data group N_vl1($h$1) in the A storage of the noise data storage 902 is illustrated in a timing chart shown at the lower left of FIG. 12. After one stage of buffering (ch_vl1_$d$1) has been performed in each bus width converter, the noise data groups N_vl#(h1) (#: 1 to 6) are written in the A storage at a rate of two pixels for every two clock cycles of a write clock signal clock.

An operation in which the A/D converter 105 generates optical data by performing A/D conversion on the optical signals of the pixels P of the first row to the sixth row and the first column to the mth column, and the generated optical data are written in the A storage of each of the optical data storage 901 and the optical data storage 905 of the data processor 107 will be described. From time T1$w$1 to time T1$w$2, the plurality (m×I) of A/D converters 203 of the A/D converter 105 simultaneously perform A/D conversion of the optical signals of the pixels P of the first row to the sixth row and the first column to the mth column to generate optical data under the control of the controller 102. At time T1$w$2, the plurality (m×I) of optical data generated by the plurality (m×I) of A/D converters 203 are transmitted at once to the corresponding plurality (m×I) of hold circuits 204. In this case, assume that S_vl1($h$1) is an optical data group of the first row, S_vl2($h$1) is an optical data group of the second row, . . . , and S_vl6($h$1) is an optical data group of the sixth row.

From time T1$w$2 to time T2$w$1, the optical data groups S_vl#(h1) (#: 1 to 6) held by the plurality of hold circuits 204 are transmitted to the data processor 107 via the horizontal transmitter 106. The optical data groups S_vl#(h1) (#: 1 to 6) are written in the A storage of each of the optical data storage 901 and the optical data storage 905. The operation to write the optical data groups S_vl#(h1) (#: 1 to 6) in the A storage of the optical data storage 901 and the A storage of the optical data storage 905 is performed at a rate of once every two clock cycles of the clock signal clock.

An operation to read out the noise data and the optical data of the pixels P of the first row to the sixth row and the first column to the mth column from the A storage of each of the noise data storage 902 and the noise data storage 906 and the A storage of each of the optical data storage 901 and the optical data storage 905 of the data processor 107 will be described hereinafter. At time T2, the CPU 101 outputs the horizontal synchronization signal HD to the controller 102. From time T2$r$1 to time T2$r$2, the noise data group N_vl1($h$1) of the first row and the noise data group N_vl2($h$1) of the second row are read out in parallel and the data of the noise data group of each row are sequentially read out from two pixels at once from the A storage of each of the noise data storage 902 and the noise data storage 906. Also, in parallel to this operation, from time T2$r$1 to time T2$r$2, the optical data group S_vl1($h$1) of the first row and the optical data group S_vl2($h$1) of the second row are read out in parallel and the data of the optical data group of each row are sequentially read out from two pixels at once from the A storage of each of the optical data storage 901 and the optical data storage 905. In addition, from time T2$r$1 to time T2$r$2, the difference between the optical data and the noise data is calculated for every two pixels in each of the first row and the second row by the calculation circuit 520, and the data of the calculated difference are output from the signal output circuit 108. The operation to read out the noise data group N_vl1($h$1) from the A storage of each of the noise data storage 902 and the noise data storage 906 is illustrated in a timing chart shown at the lower right of FIG. 12.

In a manner similar to the above-described operation, from time T2$r$2 to time T2$r$3, in each of the third row and the fourth row, the calculation circuit 520 calculates the difference between the optical data and the noise data for every two pixels for each of the two rows, and the data of the calculated difference are output from the signal output circuit 108. In addition, from time T2$r$3 to time T3$r$1, in each of the fifth row and the sixth row, the calculation circuit 520 calculates the difference between the optical data and the noise data for every two pixels for each of the two rows, and the data of the calculated difference are output from the signal output circuit 108.

A/D conversion operations are simultaneously performed on the noise signals of the pixels of the first row to the sixth row, and subsequently, A/D conversion operations are simultaneously performed on the optical signals of the first row to the sixth row in the manner described above. In addition, the data (the data of the difference between the optical data and the noise data) of the pixels of two rows are output in parallel, and the data of the pixels of each row are sequentially output for two pixels at once.

An operation in which the A/D converter 105 generates noise data by performing A/D conversion on the noise signals of the pixels P of the seventh row to the 12th row and the first column to the mth column, and the generated noise data are written in the B storage of each of the noise data storage 902 and the noise data storage 906 of the data processor 107 will be described. From time T2 to time T2$w$1, the plurality (m×I) of A/D converters 203 of the A/D converter 105 simultaneously perform A/D conversion of the noise signals of the pixels P of the seventh row to the 12th row and the first column to the mth column to generate noise data under the control of the controller 102. At time T2$w$1, the plurality (m×I) of noise data generated by the plurality (m×I) of A/D converters 203 are transmitted at once to the corresponding plurality (m×I) of hold circuits 204. In this case, assume that N_vl1($h$2) is a noise data group of the seventh row, N_vl2($h$2) is a noise data group of the eighth row, . . . , and N_vl6($h$2) is a noise data group of the 12th row.

From time T2$w$1 to time T2$w$2, the noise data groups N_vl#(h2) (#: 1 to 6) held by the plurality of hold circuits 204 are transmitted to the data processor 107 via the horizontal transmitter 106 so that the data of the six rows are transmitted in parallel and the data of each row are sequentially transmitted. The noise data groups N_vl#(h2) (#: 1 to 6) transmitted to the data processor 107 are written in the B storage of each of the noise data storage 902 and the noise data storage 906 in accordance with a write signal write_en and the write clock signal clock generated by the controller 102. The operation to write the noise data groups N_vl#(h2) (#: 1 to 6) in the B storage of each of the noise data storage 902 and the noise data storage 906 is performed at a rate of once every two clock cycles of the write clock signal clock.

An operation in which the A/D converter 105 generates optical data by performing A/D conversion on the optical signals of the pixels P of the seventh row to the 12th row and the first column to the mth column, and the generated noise data are written in the B storage of each of the optical data storage 901 and the optical data storage 905 of the data processor 107 will be described. From time T2$w$1 to time T2$w$2, the plurality (m×I) of A/D converters 203 of the A/D converter 105 simultaneously perform A/D conversion of the optical signals of the pixels P of the seventh row to the 12th row and the first column to the mth column to generate optical data under the control of the controller 102. At time T2$w$2, the plurality (m×I) of optical data generated by the plurality (m×I) of A/D converters 203 are transmitted at once to the corresponding plurality (m×I) of hold circuits 204. In this case, assume that S_vl1($h$2) is an optical data group of the seventh row, S_vl2($h$2) is an optical data group of the eighth row, . . . , and S_vl6($h$2) is an optical data group of the 12th row.

From time T2$w$2 to time T3$w$1, the optical data groups S_vl#(h2) (#: 1 to 6) held by the plurality of hold circuits 204 are transmitted to the data processor 107 via the horizontal transmitter 106. The optical data groups S_vl#(h2) (#: 1 to 6) are written in the B storage of each of the optical data storage 901 and the optical data storage 905. The operation to write the noise data groups S_vl#(h2) (#: 1 to 6) in the B storage of each of the optical data storage 901 and the optical data storage 905 is performed at a rate of once every two clock cycles of the write clock signal clock.

An operation to read out the noise data and the optical data of the pixels P of the seventh row to the 12th row and the first column to the mth column from the B storage of each of the noise data storage 902 and the noise data storage 906 and the B storage of the optical data storage 901 and the optical data storage 905 of the data processor 107 will be described hereinafter. At time T3, the CPU 101 outputs the horizontal synchronization signal HD to the controller 102. From time T3$r$1 to time T3$r$2, the noise data group N_vl1($h$2) of the seventh row and the noise data group N_vl2($h$2) of the eighth row are read out in parallel and the data of the noise data group of each row are sequentially read out from two pixels at once from the B storage of each of the noise data storage 902 and the noise data storage 906. Also, in parallel to this operation, from time T3$r$1 to time T3$r$2, the optical data group S_vl1($h$2) of the seventh row and the optical data group S_vl2($h$2) of the eighth row are read out in parallel and the data of the optical data group of each row are sequentially read out from two pixels at once from the B storage of each of the optical data storage 901 and the optical data storage 905. In addition, from time T3r1 to time T3r2, the calculation circuit 520 calculates the difference between the optical data and the noise data for every two pixels in each of the seventh row and the eighth row, and the data of the calculated difference are output from the signal output circuit 108.

In a manner similar to the above-described operation, from time T3r2 to time T3r3, the calculation circuit 520 calculates the difference between the optical data and the noise data for every two pixels in each of the ninth row and the tenth row, and the data of the calculated difference are output from the signal output circuit 108. In addition, from time T3r3 to time T4r1, the calculation circuit 520 calculates the difference between the optical data and the noise data for every two pixels in each of the 11th row and the 12th row, and the data of the calculated difference are output from the signal output circuit 108.

A/D conversion is simultaneously performed on the noise signals of the pixels of the seventh row to the 12th row, and subsequently, A/D conversion is simultaneously performed on the optical signals of the seventh row to the 12th row in the manner described above. In addition, the pixel data (the data of the difference between the optical data and the noise data) of two rows are output in parallel, and the data of the pixels of each row are sequentially output for two pixels at once. Subsequently, the operation using the A storage and the operation using the B storage will be performed alternately and in parallel to each other.

Figure 13:
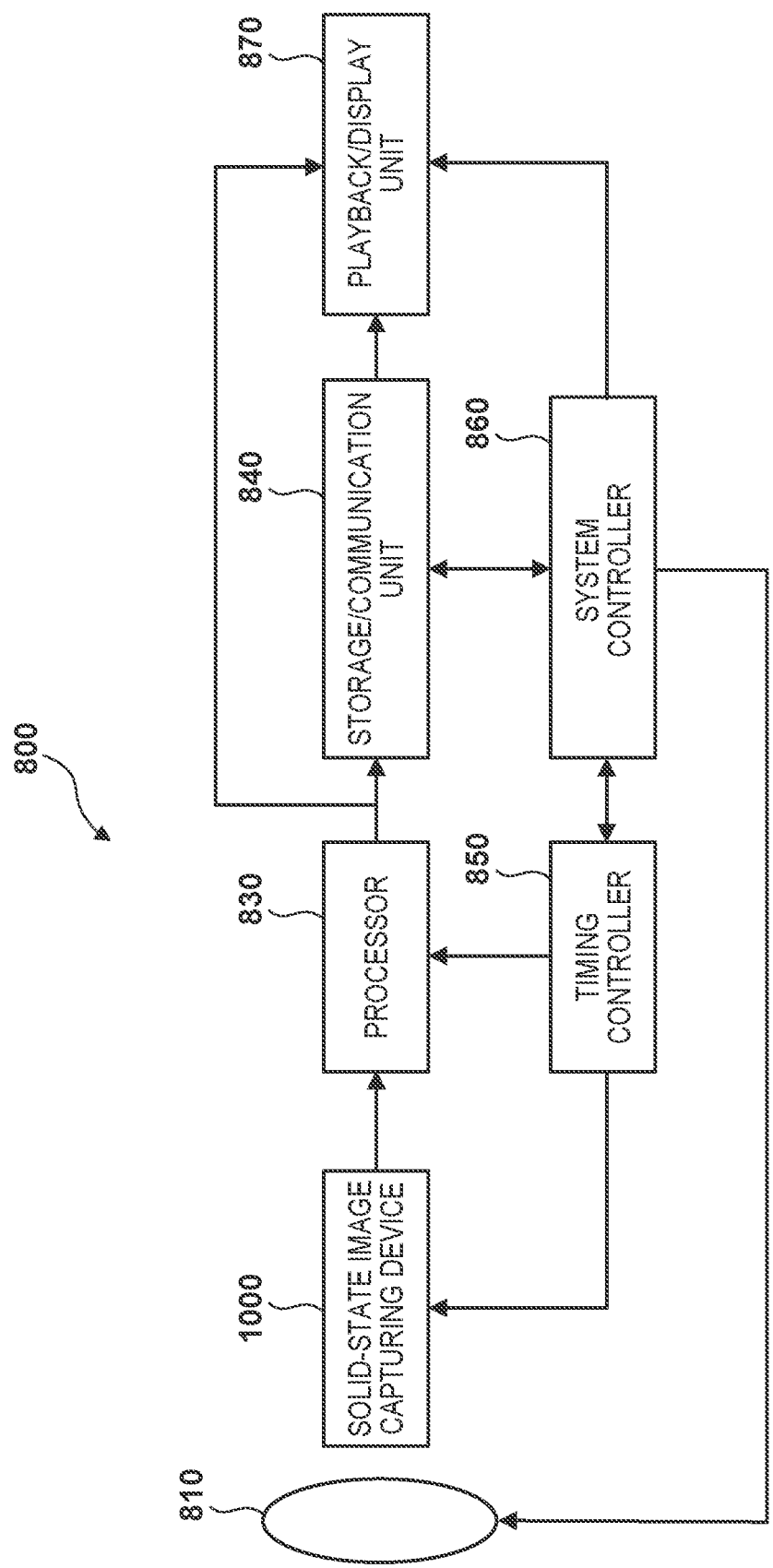
FIG. 13 is a block diagram showing an example of the arrangement of an image capturing apparatus according to an embodiment.

An image capturing apparatus 800 according to an embodiment of the present invention will be described with reference to FIG. 13. The concept of an image capturing apparatus includes, not only an apparatus whose main purpose is image capturing, but also an apparatus (for example, a personal computer or a mobile terminal) that supplementarily has an image capturing function. The image capturing apparatus 800 can include a photoelectric conversion apparatus 1 formed as a solid-state image capturing device 1000 and a processor 830 that processes data output from the solid-state image capturing device 1000.

The image capturing apparatus 800 can further include, for example, an optical system 810, a storage/communication unit 840, a timing controller 850, a system controller 860, and a playback/display unit 870. The optical system 810 forms an image of an object on a pixel array (image capturing surface) of the solid-state image capturing device 1000. The solid-state image capturing device 1000 outputs an image by performing an image capturing operation in accordance with a signal from the timing controller 850. The data output from the solid-state image capturing device 1000 is provided to the processor 830.

The processor 830 processes the data provided from the solid-state image capturing device 1000 and provides the processed data to the storage/communication unit 840. The storage/communication unit 840 transmits the image to the playback/display unit 870, and the image is played back and displayed on the playback/display unit 870. The storage/communication unit 840 also stores the image in a storage medium (not shown).

The timing controller 850 controls the drive timing of the solid-state image capturing device 1000 and the processor 830 based on the control by the system controller 860. The system controller 860 integrally controls the operation of the image capturing apparatus 800, and controls the driving of the optical system 810, the timing controller 850, the storage/communication unit 840, and the playback/display unit 870. The system controller 860 includes, for example, a storage device (not shown), and programs necessary for controlling the operation of the image capturing apparatus 800 are stored in the storage device. In addition, the system controller 860 sets, for example, a mode in accordance with an operation by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-223001, filed Dec. 10, 2019 which is hereby incorporated by reference herein in its entirety.

What is claimed is:
1. A photoelectric conversion apparatus comprising:
a pixel array which includes a plurality of pixels arranged so as to form a plurality of rows and a plurality of columns and a plurality of column signal lines configured to output noise signals and optical signals of the plurality of pixels;
a driver configured to drive the plurality of pixels so that the optical signal is output following the noise signal from each pixel;
a plurality of A/D converters configured to perform A/D conversion to convert the noise signals output from a first set of rows of the plurality of rows to the plurality of column signal lines into noise data and to perform A/D conversion to convert the optical signals output from the first set of rows of the plurality of rows to the plurality of column signal lines into optical data;
a data hold circuit; and
a transmitter configured to transmit, in a first period, the noise data of some or all of the first set of rows to the data hold circuit in parallel, and to transmit, in a second period separated from the first period, the optical data of some or all of the first set of rows to the data hold circuit in parallel.

2. The apparatus according to claim 1, wherein the plurality of column signal lines and the plurality of A/D converters are formed so that signals of pixels of a first number of rows will be provided in parallel to the plurality of A/D converters through the plurality of column signal lines, and the first number is a natural number which is not less than 2.

3. The apparatus according to claim 2, wherein the first number of rows is a number of the first set of rows.

4. The apparatus according to claim 2, wherein the plurality of A/D converters perform A/D conversion to convert noise signals, of the pixels of the first number of rows output to the plurality of column signal lines, into noise data, and perform A/D conversion to convert optical signals after converting noise signals into noise data, of the pixels of the first number of rows output to the plurality of column signal lines, into optical data.

5. The apparatus according to claim 4, wherein the first number of rows is a number of the first set of rows.

6. The apparatus according to claim 4, wherein the transmitter performs a first transmission which is a transmission, to the data hold circuit, the noise data of the pixels of the first number of rows which were converted by the plurality of A/D converters, and a second transmission which is a transmission, to the data hold circuit, the optical data of the pixels of the first number of rows which were converted by the plurality of A/D converters, after the first transmission.

7. The apparatus according to claim 6, wherein the first number of rows is a number of the first set of rows.

8. The apparatus according to claim 6, wherein the data hold circuit outputs, through a second number of channels which are arranged in parallel to each other, noise data corresponding to the second number and optical data corresponding to the second number, and
the second number is a natural number smaller than the first number.

9. The apparatus according to claim 6, wherein the data hold circuit outputs, through a second number of channels which are arranged in parallel to each other, noise data corresponding to the second number and optical data corresponding to the second number, and
the second number is a natural number equal to the first number or smaller than the first number.

10. The apparatus according to claim 9, wherein the data hold circuit includes a noise data storage configured to hold the noise data of the pixels of the first number of rows and an optical data storage configured to hold the optical data of the pixels of the first number of rows.

11. The apparatus according to claim 10, wherein the noise data storage includes a first storage and a second storage which can be accessed independently of each other, and
the optical data storage includes a third storage and a fourth storage which can be accessed independently of each other.

12. The apparatus according to claim 9, wherein the data hold circuit includes a first noise data storage configured to hold the noise data of the pixels of the first number of rows, a second noise data storage configured to hold the noise data of the pixels of the first number of rows, a first optical data storage configured to hold the optical data of the pixels of the first number of rows, and a second optical data storage configured to hold the optical data of the pixels of the first number of rows.

13. The apparatus according to claim 12, wherein each of the first noise data storage, the second noise data storage, the first optical data storage, and the second optical data storage includes two storages which can be accessed independently of each other.

14. The apparatus according to claim 12, wherein each of the first noise data storage, the second noise data storage, the first optical data storage, and the second optical data storage includes a bus width converter configured to receive half of the first number of data twice and output the received data as the first number of data and a storage configured to hold the data of the pixels of the first number of rows output from the bus width converter.

15. The apparatus according to claim 12, wherein the first noise data storage includes a first bus width converter configured to receive half of the first number of noise data twice and output the received data as the first number of noise data and a first storage configured to hold the noise data of the pixels of the first number of rows output from the first bus width converter,
the second noise data storage includes a second bus width converter configured to receive half of the first number of noise data twice and output the received data as the first number of noise data and a second storage configured to hold the noise data of the pixels of the first number of rows output from the second bus width converter,
the first optical data storage includes a third bus width converter configured to receive half of the first number of optical data twice and output the received data as the first number of optical data and a third storage configured to hold the optical data of the pixels of the first number of rows output from the third bus width converter, and
the second optical data storage includes a fourth bus width converter configured to receive half of the first number of optical data twice and output the received data as the first number of optical data and a fourth storage configured to hold the optical data of the pixels of the first number of rows output from the fourth bus width converter.

16. The apparatus according to claim 9, further comprising:
a calculation circuit configured to calculate a difference between the optical data and the noise data,
wherein the data hold circuit outputs the noise data and the optical data to the calculation circuit.

17. The apparatus according to claim 9, wherein the first number of rows is a number of the first set of rows.

18. The apparatus according to claim 1, comprising:
a first semiconductor substrate on which the pixel array is arranged; and
a second semiconductor substrate on which the data hold circuit is arranged.

19. The apparatus according to claim 18, wherein the driver and the plurality of A/D converters are arranged on the second semiconductor substrate.

20. An image capturing apparatus comprising:
a photoelectric conversion apparatus defined in claim 1; and
a processor configured to process data from the photoelectric conversion apparatus.

21. The apparatus according to claim 1, wherein the second period starts after finishing transferring the noise data of the first set of rows to the data hold circuit from the plurality of A/D converters by the transmitter.

22. A photoelectric conversion apparatus comprising:
a pixel array which includes a plurality of pixels arranged so as to form a plurality of rows and a plurality of columns and a plurality of column signal lines configured to output optical signals of the plurality of pixels;
a plurality of A/D converters configured to perform A/D conversion to convert the optical signals output from a first set of rows of the plurality of rows to the plurality of column signal lines into optical data;
a data hold circuit; and
a transmitter configured to transmit the optical data of the first set of rows to the data hold circuit in parallel,
wherein the data hold circuit outputs, in a first period, the optical data of a part of the first set of rows, and outputs, in a second period separated from the first period, the optical data of the other part of the first set of rows,
the plurality of column signal lines outputs noise signals of the plurality of pixels, and the plurality of A/D converters perform A/D conversion to convert noise signals, of the pixels of the first set of rows output to the plurality of column signal lines, into noise data, and perform A/D conversion to convert optical signals after converting noise signals into noise data, of the pixels of the first set of rows output to the plurality of column signal lines, into optical data.

23. The apparatus according to claim 22, wherein the plurality of column signal lines and the plurality of A/D converters are formed so that signals of pixels of the first set of rows will be provided in parallel to the plurality of A/D converters through the plurality of column signal lines.

24. The apparatus according to claim 22, wherein the transmitter performs a first transmission which is a transmission, to the data hold circuit, the noise data of the pixels of the first set of rows which were converted by the plurality of A/D converters, and a second transmission which is a transmission, to the data hold circuit, the optical data of the pixels of the first set of rows which were converted by the plurality of A/D converters, after the first transmission.

25. The apparatus according to claim 24, wherein the data hold circuit outputs, through a second number of channels which are arranged in parallel to each other, optical data corresponding to the second number, and
the second number is a natural number smaller than a number of the first set of rows.

26. The apparatus according to claim 25, wherein the data hold circuit outputs, through a second number of channels which are arranged in parallel to each other, noise data corresponding to the second number.

27. The apparatus according to claim 26, wherein the first period and the second period are after the third period and the fourth period.

28. The apparatus according to claim 24, wherein the data hold circuit outputs, in a third period, the noise data of a part of the first set of rows, and outputs, in a fourth period separated from the third period, the noise data of the other part of the first set of rows,
wherein a period of the first transmission includes the third period and the fourth period.

29. The apparatus according to claim 28, wherein the first period and the second period are after the third period and the fourth period.

30. The apparatus according to claim 22, further comprising: a calculation circuit configured to calculate a difference between the optical data and the noise data, wherein the data hold circuits outputs the noise data and the optical data to the calculation circuit read out from the data hold circuit.

31. The apparatus according to claim 22, wherein the data hold circuit outputs, in a third period, the noise data of a part of the first set of rows, and outputs, in a fourth period separated from the third period, the noise data of the other part of the first set of rows.

* * * * *